(12) United States Patent
Wicaksono et al.

(10) Patent No.: US 9,906,648 B2
(45) Date of Patent: Feb. 27, 2018

(54) METHOD AND SYSTEM FOR PREDICTION OF CONTACT ALLOCATION, STAFF TIME DISTRIBUTION, AND SERVICE PERFORMANCE METRICS IN A MULTI-SKILLED CONTACT CENTER OPERATION ENVIRONMENT

(71) Applicant: Interactive Intelligence Group, Inc., Indianapolis, IN (US)

(72) Inventors: Bayu Aji Wicaksono, Laurel, MD (US); Wei Xun Ter, Annapolis, MD (US); Amit Garg, Annapolis, MD (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 14/494,503

(22) Filed: Sep. 23, 2014

(65) Prior Publication Data
US 2016/0088153 A1    Mar. 24, 2016

(51) Int. Cl.
*H04M 3/00* (2006.01)
*H04M 5/00* (2006.01)
(Continued)

(52) U.S. Cl.
CPC ......... *H04M 3/523* (2013.01); *H04M 3/5175* (2013.01); *H04M 2203/402* (2013.01); *H04M 2203/556* (2013.01)

(58) Field of Classification Search
CPC ............... G06Q 10/04; G06Q 10/0631; G06Q 10/06311; G06Q 10/06315;
(Continued)

(56) References Cited

U.S. PATENT DOCUMENTS

| | | | | |
|---|---|---|---|---|
| 5,185,780 | A | * | 2/1993 | Leggett .................... 379/265.08 |
| 5,325,292 | A | * | 6/1994 | Crockett ................. G06Q 10/06 705/7.18 |

(Continued)

FOREIGN PATENT DOCUMENTS

| | | |
|---|---|---|
| EP | 1107556 | 6/2001 |
| EP | 0976237 B1 | 5/2011 |

OTHER PUBLICATIONS

Written Opinion of the International Searching Authority dated Dec. 29, 2014, in related International Application PCT/US2014/057067 (filed Sep. 23, 2014).

(Continued)

*Primary Examiner* — Ahmad F Matar
*Assistant Examiner* — Kharye Pope
(74) *Attorney, Agent, or Firm* — Lewis Roca Rothgerber Christie LLP

(57) ABSTRACT

A method and system for prediction in a telecommunications network are described. Particularly, contact allocation, staff time distribution, and other performance metrics may be determined in a contact center operation environment comprising multiple media types and/or multiple agent skill sets for handling contact types. In an embodiment, models simulating queue behavior are built. Staff count may be altered in order to determine staffing allocations and performance scenarios using the models. Long term and short term predictions may be used to configure the telecommunication network and route communications through the telecommunications network.

35 Claims, 19 Drawing Sheets

(51) Int. Cl.
*H04M 3/523* (2006.01)
*H04M 3/51* (2006.01)
*H04L 12/66* (2006.01)

(58) Field of Classification Search
CPC ......... G06Q 10/0637; G06Q 10/06375; G06Q 10/0639; G06Q 10/06398; G06Q 30/0202; H04M 2203/402; H04M 3/50; H04M 3/5175
USPC ..... 379/265, 266; 705/7.38, 7.17, 7.25, 320, 705/7.12, 7.13, 7.42
See application file for complete search history.

(56) References Cited

U.S. PATENT DOCUMENTS

| | | | | |
|---|---|---|---|---|
| 6,044,355 | A * | 3/2000 | Crockett | G06Q 10/06 379/265.05 |
| 6,389,132 | B1 | 5/2002 | Price | |
| 6,790,829 | B1 * | 9/2004 | Kelly et al. | 514/2.4 |
| 6,970,829 | B1 * | 11/2005 | Leamon | G06Q 10/06 370/270 |
| 7,046,789 | B1 * | 5/2006 | Anderson et al. | 379/265.01 |
| 7,251,589 | B1 * | 7/2007 | Crowe | G06F 17/18 702/181 |
| 7,716,022 | B1 * | 5/2010 | Park | G06Q 10/10 702/181 |
| 7,725,339 | B1 * | 5/2010 | Aykin | 705/7.14 |
| 8,209,218 | B1 * | 6/2012 | Basu | G06Q 10/0637 705/7.36 |
| 8,612,272 | B1 | 12/2013 | Aykin | |
| 8,811,597 | B1 * | 8/2014 | Hackbarth | G06Q 10/06395 379/265.02 |
| 2002/0054587 | A1 | 5/2002 | Baker et al. | |
| 2002/0143597 | A1 * | 10/2002 | Andre | G06Q 10/06311 705/7.14 |
| 2002/0143599 | A1 * | 10/2002 | Nourbakhsh | G06Q 10/06 705/7.31 |
| 2003/0018702 | A1 | 1/2003 | Broughton et al. | |
| 2003/0095652 | A1 * | 5/2003 | Mengshoel | H04M 3/5233 379/265.06 |
| 2004/0264672 | A1 | 12/2004 | Paek et al. | |
| 2005/0021384 | A1 * | 1/2005 | Pantaleo et al. | 705/9 |
| 2005/0137893 | A1 * | 6/2005 | Whitman, Jr. | 705/1 |
| 2005/0160142 | A1 * | 7/2005 | Whitman, Jr. | 709/205 |
| 2006/0015388 | A1 | 1/2006 | Flockhart et al. | |
| 2006/0062376 | A1 * | 3/2006 | Pickford | H04M 3/5183 379/265.12 |
| 2006/0256953 | A1 * | 11/2006 | Pulaski | H04M 3/5175 379/265.06 |
| 2007/0061183 | A1 * | 3/2007 | Seetharaman | G06Q 10/06 705/7.13 |
| 2007/0121899 | A1 * | 5/2007 | Galvin | 379/265.05 |
| 2007/0198322 | A1 | 8/2007 | Bourne et al. | |
| 2008/0037760 | A1 * | 2/2008 | Boughton et al. | 379/265.02 |
| 2009/0180606 | A1 * | 7/2009 | Omiya | G06Q 10/04 379/265.05 |
| 2009/0210535 | A1 | 8/2009 | Whitman, Jr. | |
| 2011/0116617 | A1 * | 5/2011 | Fan | H04M 3/5232 379/265.11 |
| 2012/0014519 | A1 | 1/2012 | Kosiba et al. | |
| 2012/0016712 | A1 * | 1/2012 | Kosiba et al. | 705/7.25 |
| 2012/0087486 | A1 | 4/2012 | Guerrero | |
| 2012/0134487 | A1 * | 5/2012 | Flockhart | H04M 3/5233 379/265.12 |
| 2012/0197678 | A1 | 8/2012 | Ristock et al. | |
| 2013/0191185 | A1 * | 7/2013 | Galvin | G06Q 30/01 705/7.37 |
| 2014/0173078 | A1 * | 6/2014 | McCord | H04L 45/44 709/223 |
| 2014/0219436 | A1 | 8/2014 | Kosiba et al. | |
| 2014/0376709 | A1 * | 12/2014 | Shaffer et al. | 379/265.06 |
| 2015/0078547 | A1 * | 3/2015 | Walls | H04M 3/5233 379/265.09 |
| 2015/0087486 | A1 * | 3/2015 | Franks | A63B 21/0442 482/129 |
| 2015/0195404 | A1 * | 7/2015 | O'Connor | H04M 3/5175 379/265.03 |
| 2015/0195405 | A1 * | 7/2015 | McCormack | H04M 3/5175 379/265.06 |
| 2015/0286982 | A1 * | 10/2015 | Dwyer | G06Q 10/067 705/7.17 |

OTHER PUBLICATIONS

Written Opinion of the International Searching Authority dated Feb. 4, 2015 in related international application PCT/US2014/060860, international filing date Oct. 16, 2014.

* cited by examiner

400

800

| Call Type | Answered | tTalkACD (sec) | Available Time (sec) | Call Level FTE |
|---|---|---|---|---|
| Phone (CT1) | 2 | 500 | 22.73 | 0.29 |
| Phone (CT2) | 3 | 600 | 27.27 | 0.35 |

| Call Type | Answered | tTalkACD (sec) | tAgentOnACD (sec) |
|---|---|---|---|
| Phone (CT1) | 2 | 500 | 1100 |
| Phone (CT2) | 3 | 600 | 1100 |
| Email (CT1) | 5 | 2000 | 1100 |

| Call Type | Available Time | Call Level FTE |
|---|---|---|
| Phone (CT1) | 22.73 | 0.29 |
| Phone (CT2) | 27.27 | 0.35 |

Fig. 10

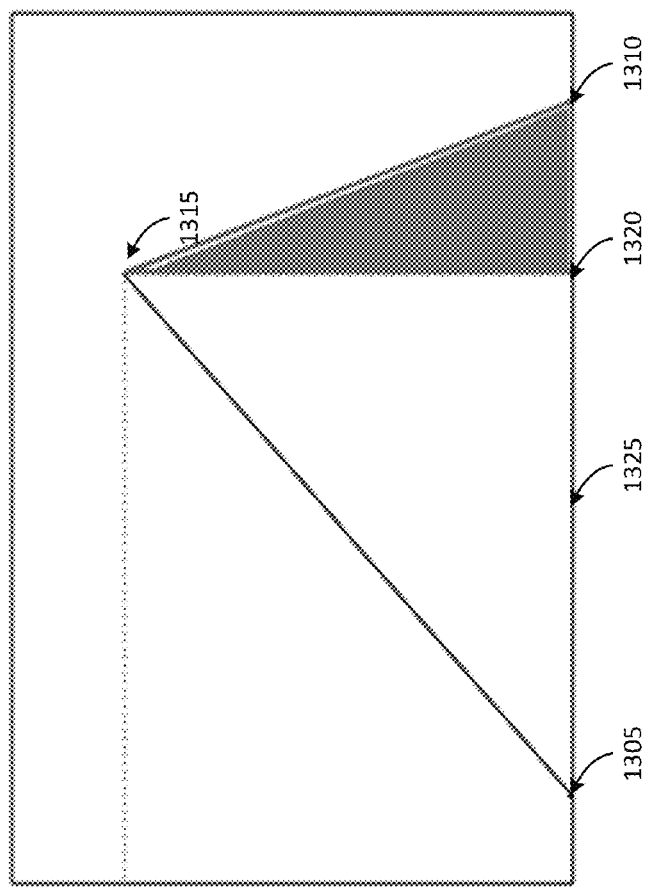

1400

| ASA_lower | ASA_upper | Abandon CDF |
|---|---|---|
| 0 | 8 | 0.633161249 |
| 8 | 16 | 1.71503303 |
| 16 | 18 | 1.889510364 |
| 18 | 28 | 2.125941235 |
| 28 | 30 | 3.326136008 |
| 30 | 34 | 4.13809742 |
| 34 | 46 | 4.984421614 |
| 46 | 50 | 5.30087408 |
| 50 | 60 | 7.282943522 |
| 60 | 75 | 7.929883151 |
| 75 | 105 | 9.243130863 |
| 105 | 115 | 11.54355244 |
| 115 | 130 | 17.02885692 |
| 130 | 200 | 19.13081558 |

| Min | Mode | Max |
|---|---|---|
| 201 | 449 | 1248 |

Fig. 14B

METHOD AND SYSTEM FOR PREDICTION OF CONTACT ALLOCATION, STAFF TIME DISTRIBUTION, AND SERVICE PERFORMANCE METRICS IN A MULTI-SKILLED CONTACT CENTER OPERATION ENVIRONMENT

BACKGROUND

The present invention generally relates to telecommunications networks, as well as contact centers. More particularly, the present invention pertains to configuring a telecommunications network based upon long term and short term planning in a multi-skilled contact center operation environment.

SUMMARY

A method and system for prediction in a telecommunications network are described. Particularly, contact allocation, staff time distribution, and other performance metrics may be determined in a contact center operation environment comprising multiple media types and/or multiple agent skill sets for handling contact types. In an embodiment, models simulating queue behavior are built. Staff count may be altered in order to determine staffing allocations and performance scenarios using the models. Long term and short term predictions may be used to configure the telecommunication network and route communications through the telecommunications network.

Other features and advantages will be apparent from the description, the drawings, and the claims.

In one embodiment, a method is described for configuring a telecommunication network comprising a network configuration optimization system and an automatic communication distributor operatively coupled to a plurality of agent telecommunication stations in a multi-skilled contact center operation environment including a plurality of staff comprising a plurality of staff types, the method comprising the steps of: a) using the network configuration optimization system to build one or more models using predetermined input metrics for one or more respective queues maintained by the automatic communication distributor, wherein each of said models simulates behavior of the respective queue; b) using the network configuration optimization system to create a table for each of the one or more models by altering a staff count for the contact center in each of the one or more models, wherein the table represents service performance of the contact center operation environment for the respective staff count as predicted by the respective model; c) using the network configuration optimization system to build an other model from the one or more models, wherein said other model simulates how contacts in each of the one or more queues are routed within the telecommunication network and which of the plurality of staff types handles the contacts; d) using the network configuration optimization system to evaluate the service performance to determine if excess ones of the plurality of staff are available by performing a first linear programming formulation using the created table, wherein if excess ones of the plurality of staff are found to be available, creating a second linear programming formulation to allocate the excess ones of the plurality of staff to a selected one of the plurality of staff types according to the ratio of the staff types determined by the first linear programming formulation; e) configuring the telecommunication network by assigning staff type designations to the plurality of agent telecommunication stations in accordance with the determination of step (d); and f) using the automatic communication distributor to route communications to the plurality of agent telecommunication stations in accordance with the staff type designations assigned to each of the plurality of agent telecommunication stations in step (e).

In another embodiment, a method is described for configuring a telecommunication network comprising a network configuration optimization system and an automatic communication distributor operatively coupled to a plurality of agent telecommunication stations for predicting service performance and generating a staffing requirement from said prediction in a multi-skill network, including a plurality of staff comprising a plurality of staff types, the method comprising the steps of: a) using the network configuration optimization system to build one or more simulation models using predetermined input metrics for one or more respective queues maintained by the automatic communication distributor, wherein the predicting is for a long term interval of time, determining a distribution demonstrative of a virtual representation of a historical environment of the network at different time intervals, wherein said determination comprises at least one of: i) selecting the distribution from among existing historical distributions; ii) deriving the distribution from fitting a curve on existing historical data; and iii) deriving the distribution from an average value of data in each interval of time profile; b) using the network configuration optimization system to build one or more linear programming models to simulate how contacts in each of the one or more queues are routed within the telecommunication network and which of the plurality of staff types handles the contacts; c) using the network configuration optimization system to create a service performance table for each simulation model built by altering the number of staff; d) using the network configuration optimization system to evaluate the service performance to determine if excess ones of the plurality of staff are available by performing a first linear programming, wherein if excess ones of the plurality of staff are found to be available, creating another linear programming formulation to allocate the remainder of the unallocated staff to a corresponding staff type according to the ratio of the staff types determined by the first linear programming; e) configuring the telecommunication network by assigning staff type designations to the plurality of agent telecommunication stations in accordance with the determination of step (d); and f) using the automatic communication distributor to route communications to the plurality of agent telecommunication stations in accordance with the staff type designations assigned to each of the plurality of agent telecommunication stations in step (e).

In yet another embodiment, a method is disclosed for configuring a telecommunication network comprising a network configuration optimization system and an automatic communication distributor operatively coupled to a plurality of agent telecommunication stations for in a multi-skilled contact center operation environment including a plurality of staff comprising a plurality of staff types, the method comprising the steps of: a) using the network configuration optimization system to build one or more models using predetermined input metrics for one or more respective queue maintained by the automatic communication distributor, wherein each of said models simulates behavior of the respective queue; b) using the network configuration optimization system to determine a distribution demonstrative of a virtual representation of a historical environment of the contact center operation environment at different time intervals; c) using the network configuration optimization system to create a table for each of the one or more models by altering a staff count for the contact center, wherein the table represents service performance of the contact center operation environment for the respective staff count as predicted by the respective model; d) using the network configuration optimization system to build an other model from the one or more models built, wherein said other model simulates how contacts in each of the one or more queues are routed in the telecommunication network and which of the plurality of staff types handles the contacts; e) using the network configuration optimization system to evaluate the service performance to determine if excess ones of the plurality of staff are available by performing a first linear programming formulation using the created table, wherein if excess ones of the plurality of staff are found to be available, creating an other linear programming formulation to allocate the excess ones of the plurality of staff to a corresponding one of the plurality of staff types according to the ratio of staff types from the first linear programming formulation; f) configuring the telecommunication network by assigning staff type designations to the plurality of agent telecommunication stations in accordance with the determination of step (e); and g) using the automatic communication distributor to route communications to the plurality of agent telecommunication stations in accordance with the staff type designations assigned to each of the plurality of agent telecommunication stations in step (f).

BRIEF DESCRIPTION OF THE DRAWINGS

FIG. 8 is an example of a table created by a network configuration optimization system for use in available time allocation.

FIG. 9 is an example of a table created by a network configuration optimization system for use in available time allocation.

FIG. 10 is an example of a table created by a network configuration optimization system for use in available time allocation.

FIG. 13 is an embodiment of a triangular distribution.

FIG. 14A is an example of patience curve parameters.

FIG. 14B is an example of the results from a triangular distribution.

DETAILED DESCRIPTION

Figure 1:
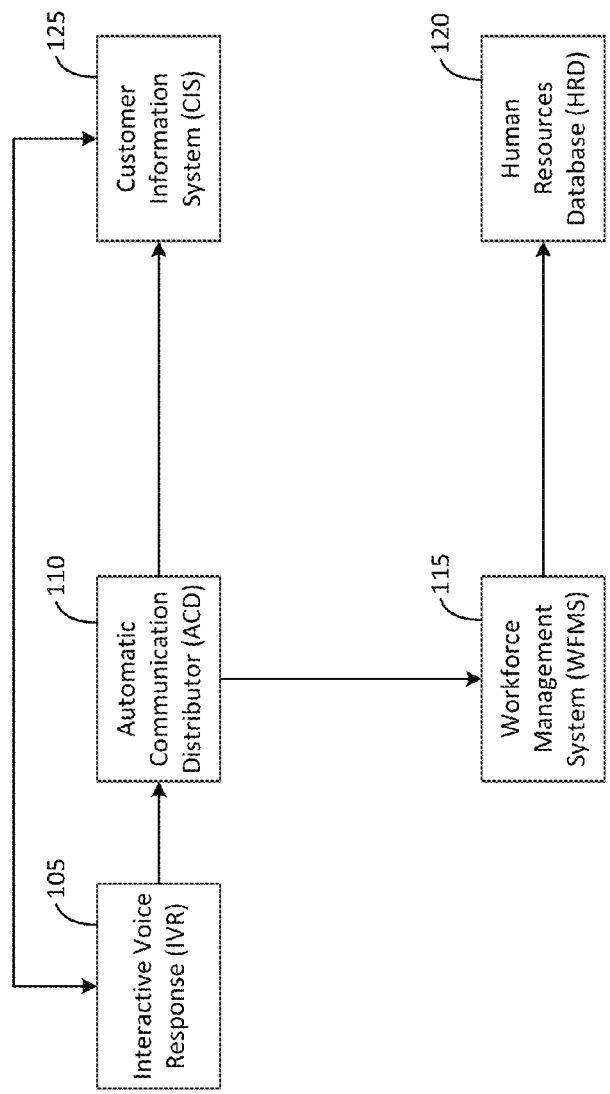
FIG. 1 is a diagram illustrating an embodiment of a typical telecommunications network within a contact center.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a diagram illustrating an embodiment of a typical telecommunications network within a contact center, indicated generally at 100. A typical telecommunications network within a contact center 100 known in the prior art includes an Interactive Voice Response system (IVR) 105, an Automatic Communication Distributor (ACD) 110, a Workforce Management System (WFMS) 115, a Human Resources Database (HRD) 120, and a Customer Information System (CIS) 125. The telecommunications network of some contact centers may vary from the telecommunications network 100 in that the data systems in the network may be combined and the infrastructure configuration may differ. Nevertheless, the function of the systems and the type of data residing in these other telecommunications networks is consistent with that residing in the telecommunications network 100, and therefore, the following discussion will also apply to these other networks.

The IVR 105 is an automated voice response system that is activated when a communication, such as a call, is received by the contact center. The IVR 105 provides a variety of options to a caller that are used to determine the purpose of the call and that are ultimately used to route the call to the appropriate resource. The IVR 105 also may obtain the caller's account or customer number (if one is available) and accesses the CIS 125 to determine how this caller should be treated based on the caller's account information (e.g., exposed to a tailored advertisement or, if a particularly good customer, routed to the best agent). The IVR sends the time called, the account number, the options chosen, and other data to the ACD 110 and to the CIS 125.

The ACD 110 automatically distributes the incoming communications, such as calls, to available resources within the telecommunications network 100 (e.g., agent telecommunication systems which may comprise phone agents and phone lines). In an embodiment, the network 100 may operate as part of a contact center at one or more physical locations which may be remote from each other. Agent telecommunication systems, or workstations, may be coupled to the network 100. Although not shown to preserve clarity, the workstations each include a workstation computer coupled to a display. Digital telephones are each associated with a different workstation. Each digital telephone may be connected to the network 100 through a network interface. In a further form, the connection to the network may be made first to the digital phone, then from the digital phone to the workstation computer by way of a pass-through connection on the digital phone or vice versa. Alternatively, two connections from the network can be made, one to the digital phone and one to the workstation computer. Additionally, in yet another form, digital telephones may be integrated into the agent computer and/or implemented in software. Each agent workstation may include one or more operator input devices, such as a keyboard, mouse, etc. Also, besides the display, one or more other output devices may be included such as loudspeaker(s) and/or a printer.

The ACD 110 also sends call interval data to the WFMS 115 (i.e., call data summarized by a particular unit of time, such as by half-hour). The call interval data includes, for each interval, call volume (e.g., 400 calls), number of phone agents available, number of phone agents occupied by handling calls, average handle time (e.g., 2 minutes), number of abandons, the mean time to abandon, the average wait time, service level (e.g. of the proportion of calls answered in less than or equal to a specified number of seconds, such as 80% within 20 seconds, for example), and the average call duration. The ACD 110 also sends call-by-call data to the CIS 125. The call-by-call data includes the wait time of the call, the employee that handled the call, the handle time of the call, the time to abandon (if applicable), the amount of after call work or casework required, and details on the customer order, purchases, or other activity (if applicable).

WFMS 115 forecasts contact volumes and handle times and develops employee schedules in such a manner that resources are available to answer or process the incoming flow of contacts. The WFMS 115 uses generic forecasting techniques such as moving averages or autoregressive integrated moving average (ARIMA) models to predict, for any future day, the number of contacts the center can expect. The WFMS 115 then determines the phone agent staffing levels by time of day that will result in the center's meeting an overall service standard goal for the forecasted number of contacts. Shift optimization determinations are then used to determine the shifts that will best cover the estimated staffing requirements. The WFMS 115 also provides processes to monitor phone agent productivity and to allow phone agents to select and manage their weekly work-shifts. The WFMS 115 sends schedules, shift swaps, schedule adherence, and hours worked data to the HRD 120.

The HRD 120 tracks payroll information and the number of hours worked by phone agents. Specifically, the HRD 120 tracks schedules, shifts, schedule adherence, hours worked, vacation accrued, salary information, and hiring costs. The HRD 120 receives the forecast from the WFMS 115 and uses it to determine when to hire new employees and when to schedule training classes.

The CIS 125 incorporates customer account information including customer segmentation and customer value and gathers call-by-call data from the ACD 110 into a common computer database. The CIS 125 delivers account information such as customer value to the IVR 105 in order to assign an appropriate treatment for a given caller (e.g., if the customer is highly valued, route the call to the best agent).

The typical telecommunications network within a contact center 100 is not able to generate rapid analysis and plans for staffing, budgeting, call handling, and service quality goal setting. Nothing in the typical telecommunications network 100 allows the management of a contact center to quickly and accurately know the effects on contact center performance of changes in staff, budgets, call handling, and service goals. The analytic techniques used in a typical telecommunications network within a contact center 100 are not able to perform these analyses because they are either too simplistic for these types of scenarios (e.g., Erlang C) or too slow for rapid "what-if" analysis (e.g., discrete-event simulation).

Figure 2:
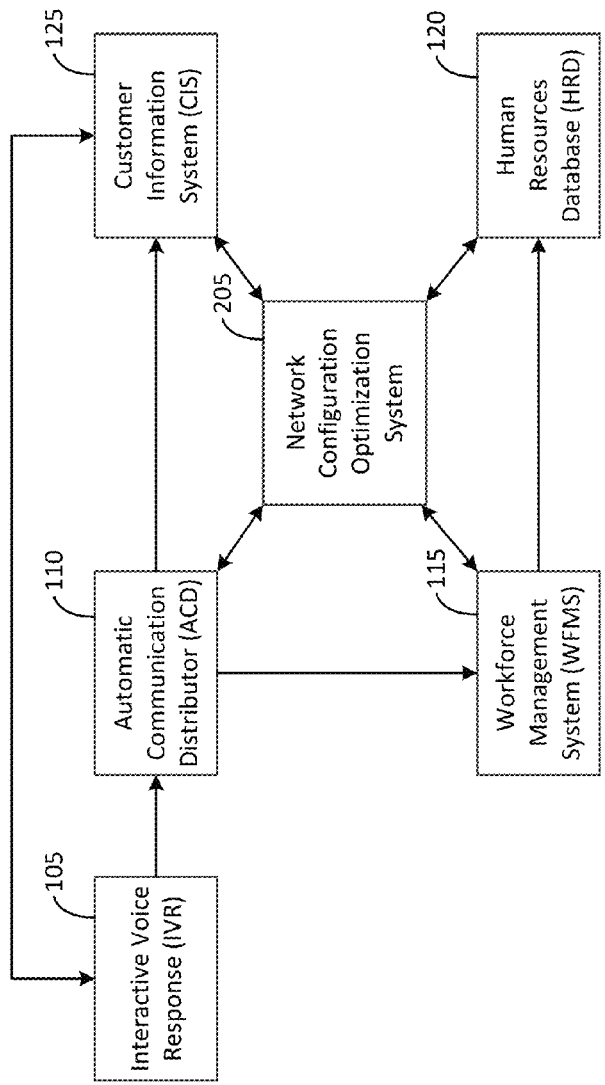
FIG. 2 is a diagram illustrating an embodiment of a modified telecommunications network within a contact center.

Referring to FIG. 2, one implementation of a telecommunications network within a contact center 200 is shown that includes the typical performance monitoring and analysis components associated with the telecommunications network 100 with an additional interconnected Network Configuration Optimization System 205. The Network Configuration Optimization System 205 exchanges performance data and performance history data with the performance monitoring systems in the telecommunications network 100 and produces rapid analyses and plans for staffing, budgeting, call handling, and service quality goal setting. While the exemplary implementation of the telecommunications network is within a contact center system, it should be understood that the telecommunications network may include any type of system in which work is handled by a workforce having a finite number of resources. Such systems may include, but not be limited to, operations that handle and process incoming e-mail messages and inquiries, facsimile messages, insurance claims, and financial instruments including checks and coupons.

The Network Configuration Optimization System 205 receives performance information directly from all of the performance monitoring systems in the telecommunications network 100 with the exception of the IVR 105. Specifically, the ACD 110 provides the Network Configuration Optimization System 205 with regular feeds of call interval data. The Network Configuration Optimization System 205 may, alternatively, receive call interval data from the WFMS 115 rather than the ACD 110. The WFMS 115 provides the Network Configuration Optimization System 205 with periodic feeds of the latest contact volume forecast including the contact volume (e.g., call volume) and handle time forecast. The WFMS 115 also may provide the Network Configuration Optimization System 205 with a schedule adherence forecast. The HRD 120 provides the Network Configuration Optimization System 205 with agent salary information and hiring costs that may be accessed by the system 205 as needed. Finally, the CIS 125 provides the Network Configuration Optimization System 205 with customer segmentation, customer value, and call-by-call data.

The Network Configuration Optimization System 205 also sends information back to all of the performance monitoring systems in the telecommunications network 200. Specifically, the Network Configuration Optimization System 205 sends the call routing plan (e.g. how best to route different types of calls) back to the analysts who manage the ACD 110. The Network Configuration Optimization System 205 provides the WFMS 115 with the staffing plan. The staffing plan includes the hiring plan; the number of vacation, sick, and training days; the number of agents transferred between management units; and the skills of the agents (e.g. able to speak Spanish or that can handle complex requests well). The WFMS 115 incorporates all of this information into the staffing schedule. The Network Configuration Optimization System 205 also provides the staffing plan to the HRD 120 and its analysts along with a budget estimate corresponding to that staffing plan.

Finally, the Network Configuration Optimization System 205 provides a series of customer reports to the CIS 125 and its analysts that show the experience that each customer segment has had with the contact center in the past and, given the current staffing plan, the experience each customer segment is expected to have in the future. The reports may contain the following for each customer segment: the service level, the call wait time, the probability of abandon, the mean time to abandon, the cost of abandon, the average handle time, the customer value, the distribution of call purpose, and a customer satisfaction measure.

In a typical WFMS 115 that performs the process of scheduling agents in telecommunications networks within contact centers, for example, simulation (or mathematical/ probabilistic) models are created to optimize the service performance goals for the lowest cost possible. Models are created for all possible contact/interaction types, such as customer service chats, sales calls, support e-mails, etc., in order to optimize the service performance goals for the lowest cost possible. Typical service performance goals may be: 80% of calls handled within 20 seconds or 100% of e-mails handled within 24 hours. In order to achieve these goals, for example, the WFMS 115 has to predict the interaction load and schedule the agents necessary while conforming to the customers' agent constraints. The accuracy may then be judged by whether or not service performance goals are met and by how many agent hours it schedules to achieve that. It is difficult to accurately account for every possible way that contacts/interactions flow in the network or system, especially given the multi-skilled nature of the modern contact center. Assumptions are more likely to be made that decrease the accuracy of a model.

Performance metrics may be used to create a representation that accurately reflects the reality of the system in a multi-skill and/or multi-media telecommunications network within a contact center. Parameters used by the models can be optimized to accurately reflect the system. Contact center models with optimized parameters provide the ability to generate staffing requirements given a set of forecasted inputs (such as contact volume, Average Handle Time (AHT), and predefined performance threshold). Applications of the models may include short term forecasting and scheduling, long term and strategic planning, as well as agents' vacation planning/forecast, to name a few non-limiting examples, within the telecommunications network.

For short term forecasting/scheduling purposes, the staffing requirements generated aid with allocating skills/agents handling certain contact types and the intra-day scheduling of agents to maximize performance of a contact center. For long term forecasting/strategic planning purposes, staffing requirements aid in generating plans that include hiring, over/under time analysis, as well as training of agents according to changes in business needs, for example. For vacation planning purposes, with better insight into the need/requirements of agents for the contact center, the availability of vacation slots per agent group can be generated.

Optimized parameters provide the Network Configuration Optimization System 205 with the means to determine and estimate contact center service performance with a set of pre-determined inputs. Metrics of contact center service performance may include Service Level (SL), Average Speed of Answer (ASA), and Abandon Rate (ABN). Inputs may comprise contact volume, AHT and staff Full Time Equivalent (FTE). In an embodiment, application occurs in intra-day/-week monitoring. Calculated or estimated contact center performance on the fly provides a good outlook of the intra-day/-week ahead which may provide an early warning when service performance does not meet the acceptable threshold. In another embodiment, application occurs in "what-if" analysis. Contact center performance calculation and estimation provides immediate visibility to changes in business environments such as the impact of change to an agent's schedule, impact of cross-training agents, changes in agent efficiency, etc.

Service Performance Prediction

The creation of closed form simulation models by the Network Configuration Optimization System 205 for each of the different contact/interaction types may be derived from historical ACD data to model immediate work such as inbound phone and chat. In an embodiment, Erlang-C models may be created to model callbacks and interactions without abandonment. In another embodiment, deferred work simulation may be used to model deferrable work like e-mails, casework and other back office items. The models may be validated against the historical ACD data. Multi-skill and multi-media efficiency can be simulated resulting in fast and accurate prediction of contact allocations, staff time distributions, and service performance metrics in a multi-skilled and/or multi-media telecommunications network at any level.

Figure 3:
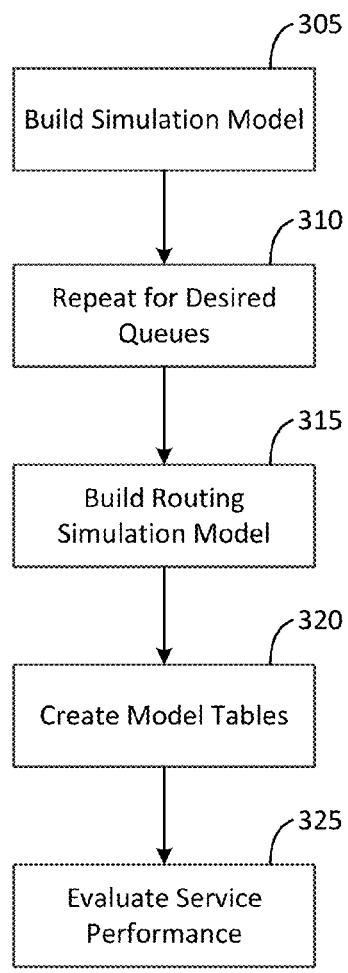
FIG. 3 illustrates an embodiment of a process for determining performance metrics and evaluating service performance executed by a network configuration optimization system.

In other embodiments, accurate staffing requirements for capacity planning, "what-if" analytics and scheduling activity may also be determined. Such information may also be used to determine the impact of routing network changes on service performance metrics. The information may also provide a consistent solution across different contact center locations. FIG. 3 illustrates an embodiment of a process for determining performance metrics and evaluating service performance executed by a network configuration optimization system, indicated generally at 300.

In operation 305, a simulation model is built. In one embodiment, during the simulation model building phase, historical ACD data may be staged for all of the interaction queues or contact types. In an embodiment, closed form simulation model parameters are estimated and then validated for each of the simulation models against historical data. Validation of the closed form simulation models are discussed in greater detail below in FIGS. 5-7. Simulation models corresponding to each of the contact/interaction types may be constructed using given input metrics. Such input metrics for a queue may comprise volume, average handle time, staff, routing profiles, contact priorities, goals, and target performance metrics, among others. Control is passed to operation 310 and process 300 continues.

In operation 310, the building of simulation models is repeated for the desired queues. In one embodiment, the number of models built corresponds to the number of desired queues. Control is passed to operation 315 and process 300 continues.

In operation 315, a model is built to simulate how contacts are routed within the telecommunications network. In one embodiment, the routing simulation model reflects the routing of contacts in relation to a queue and which of a type of staff handles the contacts. In an embodiment, a linear programming formulation may be used to build the model. In another embodiment, mixed-integer programming may be used to build the model. Control is passed to operation 320 and process 300 continues.

In operation 320, tables are created for models built in operation 305/310. For example, tables may be created for each model wherein the tables may represent service performance of the telecommunications network within a contact center. In one embodiment, staff count may be altered to determine the effect on service performance. In altering the staff count, additional staff may be added. In one non-limiting example, the staff count may be increased by one additional agent. The marginal effect of adding this one agent to the service prediction of the queue metric is represented in the constructed table and evaluated in operation 325.

Contact type performance tables may be generated which contain information regarding the benefit of adding an additional staff with respect to the targeted performance metric. Tables may be generated for each input planning period. The tables may be at an interval-level, such as hourly for short term/scheduling planning, or at a larger granularity (e.g., daily, weekly, monthly) for longer term/strategic planning.

Figure 4:
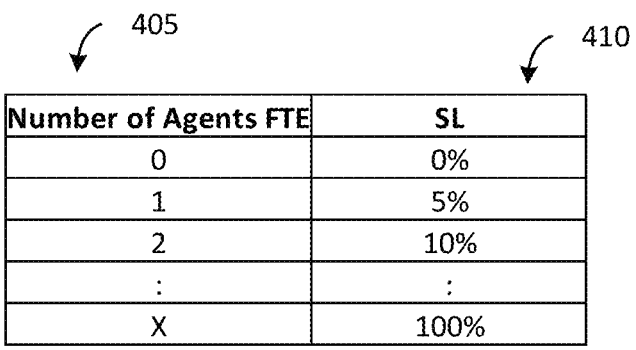
FIG. 4 illustrates an example of a table created by a network configuration optimization system for use in determining service performance.

FIG. 4 illustrates an example of a table created by a network configuration optimization system for use in determining service performance. The table 400 may be used in order to simulate the multi-skill/multi-media efficiency in determining service performance for the entire network. The table comprises the Number of Agents FTE 405 and the desired Target Performance Metric 410. The Target Performance Metric may comprise metrics such as SL, ASA, or ABN. In this example, SL is used.

Prerequisites may be required for the table. For example, the table needs to cover a sufficient range such that the linear program would recognize the marginal benefit in the target performance metric given additional staff. Ideally, the table should cover the entire spectrum [0%, 100%] for both service level and abandon rate. For ASA, the table may cover the entirety of the staff range able to handle a given contact type since it is unlikely that ASA reaches zero (particularly for inbound phone interactions).

In another embodiment, it may be necessary to populate service metrics in the case of zero FTE. For SL, zero FTE may be pre-populated with 0%. Abandon rate may be pre-populated with 100% and ASA may be at least twice the ASA value for an FTE value of 1.

In another example, the table may have, by contact type, a quick analysis of the routing to be performed. The table may be populated to the maximum aggregated staff available to answer the contact type. If the contact type CT1 can be handled by staff types S1 and S2, while CT2 can be handled by staff types S2, S3, and S4, then the maximum staff that needs to be run for CT1 would be the sum of S1 and S2. For CT2, the maximum staff to be run would be the sum of S2, S3, and S4. Once the target performance metric has reached its maximum/minimum, then no further entry is required.

In another example, after populating the table with maximum staff, contact volume and AHT, the data is passed into the respective model engine along with staff FTE beginning with a value ranging from 1 to the maximum staff FTE value. Continuous Simulation (described in pending U.S. patent application Ser. No. 14/224,409, filed Mar. 25, 2014, inventors Hendy E. Putra and Bayu Aji Wicaksono, by Interactive Intelligence Group, Inc.) may be used for immediate work scenarios such as inbound phone calls and chats. Erlang-C formulations may be used for callbacks. A Deferred Work Engine may be used for deferrable work, such as e-mail and casework.

In another example, when populating the table, the resulting service values between adjacent FTE numbers do not exceed 5% in the case of SL and Abandon Rate, and 20 seconds in ASA. If the resulting service values exceed these thresholds, then a bisection algorithm may be applied until the values do not exceed the threshold. In yet another example, contacts for which CSR values exceed 100 may be divided into two linear programming instances. The first instance identifies the overall CSR zone. The second instance identifies the CSR value. Otherwise, only one instance may be performed.

Inputs that are used to determine the resulting target performance metric by contact type may include the interaction volume and the AHT by contact/interaction type. The metric is used by the linear program to determine the optimal staff mix across the staff type(s) that can handle the different contact types.

The number of available (or forecasted) staff FTE by staff type or agent group provides the range of staff FTE to be determined for each contact type in the performance table. The target performance metric by contact type indicates which of the performance metrics are to be determined. For immediate work (e.g. inbound phone calls, chats, Ns), SL, ASA, or ABN may be determined. For callbacks, the SL and ASA may be determined. For deferred work (such as e-mail and casework), the SL may be determined. Optionally, input distributions may also be used to define the typical distribution of intervals input throughout a time period at the same level at which the simulation model is built.

For immediate work and callbacks, since each individual time interval is assumed to be independent from other time intervals, the performance table of each individual time interval may be built concurrently and separately using the Continuous Simulation model and engine or an Erlang-C model and engine based on media type.

For long-term and strategic planning periods (e.g. daily/weekly/monthly), where the performance table is not at the same interval level as the model, the following steps may be used:

(1) Using the interval volume offered and AHT distribution, distribute the interval inputs (volume and AHT) so they match the level at which the model is built;

(2) Using the interval staffing distribution, distribute the staff FTE so that it matches the level at which the model is built;

(3) Using distributed contact volume, AHT and Staff FTE from Step 1 and Step 2, determine the performance for each interval;

(4) Aggregate those performances from each individual interval up to the interval level and add these to the performance table;

(5) Iteratively increase the staff FTE from step 2 and then repeat steps 3-5; and (6) Stop when the maximum staff FTE has been achieved or the maximum achievable goal is reached. The performance table may then be used in the linear programming of service performance prediction.

For short term planning, the following steps may be used:

(1) Using interval volume and AHT distribution, distribute the interval inputs (volume and AHT) so they match the level which the model is built. This step may be skipped if the inputs are already at the interval level at which the model is built;

(2) Using the interval staffing distribution, distribute the total staff FTE so that it matches the level which the model is built. This represents the maximum available staff FTE for each interval. This step may be skipped if the inputs are already at the level at which the model is built;

(3) Using the distributed contact volume and the AHT from Step 1, obtain the performance for each interval using the model and engine. Add these to the interval performance table;

(4) Iteratively increase the staff FTE and repeat Step 3;

(5) When the maximum interval staff FTE from Step 2 has been achieved, or the maximum achievable interval goal is achieved, stop; and (6) The interval performance table may then be used in the linear programming of service performance prediction. The interval performance output/results from programming may be aggregated to the interval level. This step may be skipped if inputs are already at the level at which the model is built.

For deferred work planning, the performance table may be populated once for the entire time horizon. In an embodiment, this is because deferred work cannot be determined individually at an interval. Each interval is not independent and staff allocated in one interval may have an effect on subsequent intervals. Thus, the results may not converge and the service performance prediction will be inaccurate. The following steps may be used:

(1) Determine the interval staffing requirements FTE needed to achieve a 100% SL goal within a certain SLA threshold (e.g. 24 hours). This determination may be made using the staffing requirement generation process described in FIG. 4;

(2) Multiply the requirement level for the entire planning time horizon from Step (1) by a factor. In one embodiment, the factor may start at 1;

(3) Run the simulator using staff FTE from Step (2). Populate the interval performance table using the staff FTE and service performance if the available staff for the interval is greater than the requirement from Step (2);

(4) Iteratively reduce the factor in Step (2). In an embodiment, the factor may be decreased by 0.1 for each step. Repeat Steps (2) and (3);

(5) Stop when the factor is zero; and (6) The performance table may then be used in the linear programming of service performance prediction. If interval performance tables have been used, the results from the interval level performance may be aggregated to the interval performance.

Control is passed to operation 325 and process 300 continues.

In operation 325, service performance is evaluated. In an embodiment, service performance that is evaluated may comprise SL, ASA, and ABN. In one embodiment, the table(s) created in operation 320 may indicate that the addition of an agent would translate to an increase in SL of the contact type for which the model is built and validated for. The model built in operation 315 may then simulate the effect of adding that additional agent against all of the possible contact types/interactions in the multi-skill telecommunications network within a contact center. Linear programming may be used to perform the evaluation. The objective function is to minimize the sum of overachievement of SL with respect to the minimum SL achievement, and maximize the minimum SL achievement. This may be done using the following mathematical representation:

Minimize $\Sigma_{i \in Ct} 0.01*(FPPi)+50\times[\text{lowest priority} FPPi]+500\text{Pen}+B_{out}-0.01TH_j+5000\text{HitAllPen}+10\text{HPNMP}+2,000\Sigma_i(\text{CRNHPN}_i+\text{CRNHPX}_i)+10000\text{TolCT}_i+500\Sigma_{j \in St}\text{TolS}_j$ where i represents contact type, i ∈Ct represents a contact of contact type, FPPi represents the final optimal performance prediction of contact i, Pen represents the performance prediction ratio penalty avoidance, $B_{out}$ represents whether the maximum performance prediction is outside of a range, $TH_j$ represents the target hit/not performance level for a staff type, HPNMP represents the highest priority not max predictor, $CRNHPN_i$ represents the minimum capture rate not hitting penalty, $CRNHPX_i$ represents the maximum capture rate not hitting penalty, $TolCT_i$ represents the Tolerance for not using all available contact type i, j∈St represents a staff of staff type, and $TolS_j$ represents the tolerance for not using all available staff type j.

Constraints may be applied. In an embodiment, for each staff type j, staff type j handling all contacts must not exceed the available staff at staff type j. In another embodiment, for each contact type i, all staff types handling contact type i must equal the sum of the exact CSR entry requirement and additional CSR requirement between 2 consecutive rows in the SL table. In another embodiment, zero AHT or zero call volume may be applied. In yet another embodiment, for each contact type i, exactly one of the binary entry k connecting requirements with requirement of the SL table will be 1. In another embodiment, for each contact type i, overachievement of service level with respect to minimum service level achievement is for each pair of contact type i and j (where i≠j), the overachievement of SL with respect to minimum SL achievement is controlled by both ensuring that the lowest priority contact type achieving its optimal goal (FPPi), and also by minimizing the penalty of the service achieved (Pen) not being in the same proportion or ratio (i.e. priority-wise) as set by the user. This ensures that every contact is above or not less than the minimum service level. In another embodiment, a capture rate may be applied.

For each staff type j, staff type j handling all contacts must not exceed the available staff at staff type j, may be represented mathematically as:

$$\frac{X_{i,j,k}}{\text{Con}_{i,j,k}} \leq P_{j,k} ASt_j \forall\ j \in Staffj$$

$$\text{where } \sum_k P_{j,k} = 1 \forall\ \in Staffj$$

where $X_{i,j,k}$ represents the number of staff of staff type j handling contact type i in state k, $\text{Con}_{i,j,k}$ represents the concurrency of contact type i, in state k of staff type j, $P_{j,k}$ is the Probability of $State_k$ of staff type j happening, $ASt_j$ represents the available staff of staff type j, and Staffj represents staff of staff type j.

For each contact type i, all staff types handling contact type i must equal the sum of the exact CSR entry requirement and additional CSR requirement between two consecutive rows in the SL table, may be represented mathematically as:

$$\Sigma_k X_{i,j,k} = X_{i,j} \forall i \in Ct, j \in St$$

$$\text{and } \Sigma_{j \in St} X_{i,j} = RE_i + RA_i \forall i \in Ct$$

where k represents an index for the $k^{th}$ state of staff type j, $X_{i,j,k}$ represents the number of staff of staff type j handling contact type i in state k, $X_{i,j}$ represents the number of staff of staff type j handling contact type i, i ∈Ct represents a contact of contact type, j ∈St represents a staff of staff type, $RE_i$ represents the table requirement of contact type i, and $RA_i$ represents an additional requirement between two entries of contact type i.

Zero AHT or zero call volume may be applied, may be represented mathematically as:

$$RE_i + RA_i = 0$$

For each contact type i, exactly one of the binary entry k connecting requirements with requirements of the SL table will be 1, and may be represented mathematically as:

$$\Sigma_x B_{i,x} = 1 \forall i \in Ct$$

For each pair of contact type i and j (where i≠j), over-achievement of service level with respect to minimum service level achievement is controlled by both making sure that the lowest priority contact type is achieving its optimal goal ($FPP_i$), and also by minimizing the penalty of the service level achieved (Pen) not being in the same proportion or ratio (i.e. priority-wise) as set by the user. This may be represented mathematically as:

$$P_j*FPP_i - P_i*FPP_j - Pen <= M*(1-B_{out})$$

$$P_j*FPP_i - P_i*FPP_j - Pen \leq M*(TH_i + TH_j + B_{out})$$

$$P_j*FPP_i - P_i*FPP_j - Pen \leq M*(TH_i + B_{out} + B_{nha})$$

$$P_j*FPP_i - P_i*FPP_j - Pen <= M*(TH_j + B_{out} + 1 - B_{nha})$$

$$FPP_i - MPP - HPNMP \leq 0 \forall i \in Ct$$

$$MPP - T_{Max} \leq M*B_{out}$$

$$MPP - T_{Min} \geq -M*B_{out}$$

$$-FPP_i + TPP_i \leq M*(B_{nha}) + HSP_i$$

$$FPP_i - TPP_i \leq M*(1-B_{nha}) + HSP_i$$

$$FPP_i - TPP_i \leq M*(1-TH_i) \forall i \in Ct$$

$$0.9999 TPP_i - FPP_i <= M*(1-TH_i) \forall i \in Ct$$

where $P_j$ represents the probability of staff type j happening, $FPP_i$ represents the final optimal performance prediction (PP) of contact i, $P_i$ represents the priority of contact i=PP/maximumPP, $FPP_j$ represents the final optimal performance prediction of staff type j, Pen represents the PP ratio penalty avoidance, M represents an artificially large number (e.g. 99,999), $B_{out}$ represents whether the maximum performance prediction is outside the range or not, $TH_i$ represents the target hit/not performance level for contact i, $TH_j$ represents the target hit/not performance level for staff j, $B_{nha}$ represents a binary variable not hit all, MPP represents the FPP for the highest priority contact among all contact i, HPNMP represents the highest priority not max predictor, i ∈ Ct represents a contact of contact type, $T_{Max}$ represents the upper range for performance prediction to make special rules, $T_{Min}$ represents the lower range for performance prediction to make special rules, $TPP_i$ represents the target performance predictor level for contact i, and $HSP_i$ represents the penalty for only hitting some of the target.

For each contact type i, $RE_i$ will be exactly one of the entries in the SL table for the contact, and may be represented mathematically as:

$$RE_i - M*B_{i,x} \geq CS_x - M \forall i \in Ct, x$$

$$RE_i + M*B_{i,x} \leq CS_x + M \forall i \in Ct, x$$

$$RA_i + M*B_{i,x} \leq CS_{x+1} - CS_x + M \forall i \in Ct, x$$

Where $B_{i,x}$ represents a binary variable of a contact i for CSR entry x, $CS_x$ represents the CSR number corresponding to entry x, and x represents an entry in the service level table. For each contact type i, $FSL_i$ will correspond to exactly one of the entries in the SL table for the contact, and may be represented mathematically as:

$$FPP_i - M*B_{i,x} \geq PP_{i,x} + (PP_{i,x+1} - PP_{i,x}) * \frac{RA_i}{CS_{x+1} - CS_x} - M \forall i \in Ct, x$$

$$FPP_i - M*B_{i,x} \geq PP_{i,x} + (PP_{i,x+1} - PP_{i,x}) * \frac{RA_i}{CS_{x+1} - CS_x} + M \forall i \in Ct, x$$

where $FPP_i$ represents the final optimal performance prediction (PP) of contact i, M represents an artificially large number (e.g. 99,999), $B_{i,x}$ represents a binary variable of a contact i for CSR entry x, $PP_{i,x}$ represents the performance predictor of a contact i for CSR entry x in the SL table, $RA_i$ represents an additional requirement between two entries of contact type i, and $CS_x$ represents the CSR number corresponding to entry x.

A capture rate may be applied such that:

$$Cmin_{i,j} \leq \frac{X_{i,j}}{\sum_k X_{i,k}} \leq Cmax_{i,j} \forall i, j$$

therefore, $$X_{i,j}(1-Cmin_{i,j}) - Cmin_{i,j}*(\Sigma_{k \neq j} X_{i,k}) + CRNHPN_i \geq 0 \text{ and}$$

$$X_{i,j}(1-Cmax_{i,j}) - Cmax_{i,j}*(\Sigma_{k \neq j} X_{i,k}) - CRNHPN_i \leq 0$$

where $X_{i,j}$ represents the number of staff of staff type j handling contact type i, $C_{min}$ represents the minimum capture rate, $C_{max}$ represents the maximum capture rate and k is the index for $k^{th}$ state of staff type j, $X_{i,k}$ represents the number of contact types i in state k, and $CRNHPN_i$ represents the minimum capture rate not hitting penalty.

Extra Staff Allocation

In an embodiment, adding an additional agent could increase service of not only contact type A, but also contact type B because the agent can handle both contact types A and B. Where excess staff are found to be available in this process, another formulation may be performed to allocate the remainder of the unallocated staff to a corresponding staff type. The allocation may be performed according to the ratio of the staff from the first formulation. The second formulation, or extra staff allocation, can optimally assign extra staff through the avoidance of arbitrarily assigning extra staff to different contacts. This extra staff allocation linear program assigns extra staff in ratios consistent with the results of the first formulation.

In a non-limiting example, if a contact type C1 is handled by 9 staff and contact type C2 is handled by 10 staff, then any extra staff would be allocated in 0.9 manner, subject to any other constraints. The extra staff allocation formulation may be represented mathematically as:

$$\text{Minimize } 2HNOR - LNOR + 10,000 \Sigma_{i,j}(CRNHPN_i + CRNHPX_i)$$

where HNOR represents a fraction of the staff amount used finally divided by the product of the staff amount used in last run linear programming and the highest ratio for any contact, where LNOR represents a fraction of the staff amount used finally divided by the product of the staff amount used in last run linear programming and the lowest ratio for any contact, $CRNHPN_i$ represents the minimum capture rate not hitting the penalty, and $CRNHPX_i$ represents the maximum capture rate not hitting the penalty. The objective is to minimize the gap between HNOR and LNOR as well as minimizing HNOR itself.

Constraints may be added to the formulation. In an embodiment, for each staff type represented as j, the staff type handling all contacts must not exceed the available staff at staff type j. In another embodiment, LNOR must be greater than or equal to 1 (final staff allocated may be greater than the initial allocation by the first linear programming). In yet another embodiment, minimum/maximum capture rates may be applied. While only five constraints are illustrated, it may be noted that any number may be used and these are provided as non-limiting examples. Each of the constraints may be represented mathematically as described below.

For each staff type j, the staff type handling all contacts must not exceed the available staff at staff type j, and may be represented mathematically as:

$$\frac{X_{i,j,k}}{\text{Con}_{i,j,k}} \leq P_{j,k} ASt_j \forall j \in \text{Staff} j$$

$$\text{where } \sum_k P_{j,k} = 1 \forall \in \text{Staff} j.$$

For each contact type i, handling by all staff types for contact type i equals FRER, may be represented mathematically as:

$$\Sigma_j X_{i,j} = FRER_i \forall j \in St$$

where $FRER_i$ represents the total staff used by contact type i.

LNOR must be greater than or equal to 1 (final staff allocated may be greater than the initial allocation by the first linear programming), and may be represented as:

$LNOR \geq 1.$

The constraint FRER for each staff type must lie between LNOR and HNOR and may be represented as:

$FRER_i \geq LNOR^*\{\text{Used Staff by contact } i \text{ in the last run SPP}\}$ and $FRER_i \leq HNOR^*\{\text{Used Staff by contact } i \text{ in the last run SPP}\}.$ The constraint Minimum/Maximum capture rates may be represented as:

$$C\min_{i,j} \leq \frac{X_{i,j}}{\sum_k X_{i,k}} \leq C\max_{i,j} \forall i, j$$

Therefore, $X_{i,j}(1-C\min_{i,j})-C\min_{i,j}*(\Sigma_{k\neq j}X_{i,k})+\text{CRNHP}N_i \geq 0$ and $X_{i,j}(1-C\max_{i,j})-C\max_{i,j}*(\Sigma_{k\neq j}X_{i,k})-\text{CRNHP}N_i \leq 0.$ The process ends.

Staffing Requirement Allocation

In an embodiment, the number of staff may not be known or an analyst would like to determine how many total or additional staff are needed in order to achieve certain performance goals. Since service performance prediction utilizes a known amount of available staff, a new staffing requirement generation linear programming formulation would be needed. Service Performance Prediction (SPP) is also dependent on the historical staffing ratios. Programming optimizes these ratios to the best service performance predictor for all of the contact types according to their targets. Staffing Requirement Generation not only identifies the allocation of staff (or time) to handle specific contact types, but also where any additional staff should be added among the various staff types. The staffing requirement of different staff types is determined in such a way that the ratio of the number of used staff and the number of available staff are similar.

Using the validated models generated from the process 300, a search is performed for the contact type requirement (i.e., the number of total staff required in order to achieve service goals for a specific contact type). In an embodiment, this staff requirement is the total requirement from the contact type perspective (i.e., does not care who handles the contact). The contact type requirement determined is allocated in an optimal manner to different staff type(s) that can handle the contact type. The results comprise the staff type requirement and the contact-staff type requirement (i.e., the allocation of staff (or time) in handling different contact types in order to meet certain performance goals).

When using requirement generation in conjunction with continuous simulation models, they should be in sync. For example, for long term capacity planning, the typical input metrics may be intervals of time data such as weekly, monthly, or greater. If the simulation models are built using hourly ACD data, then additional steps may need to be taken. In one embodiment, the requirement generation process may be performed at the interval level (such as hourly). This would mean that the desired target to achieve will be at the hourly level as well. Both the SPP and the simulation modeling would be in sync since they are both operated at the same level.

In another embodiment, SPP may be performed at a longer term interval, such as weekly or monthly. This may be useful for long-term or strategic planning activity. The input metrics (interval volume, handle time, etc.) may be distributed to the interval level at which the model is built and validated for. The interval distributions may be defined for each of the input values, which may be derived from the historical interval ACD data. The input metrics values may then be converted into the interval level, the performance metrics determined using simulation models, and then aggregated back to the previous interval level, which are used to populate the performance tables used in SPP.

Figure 5:
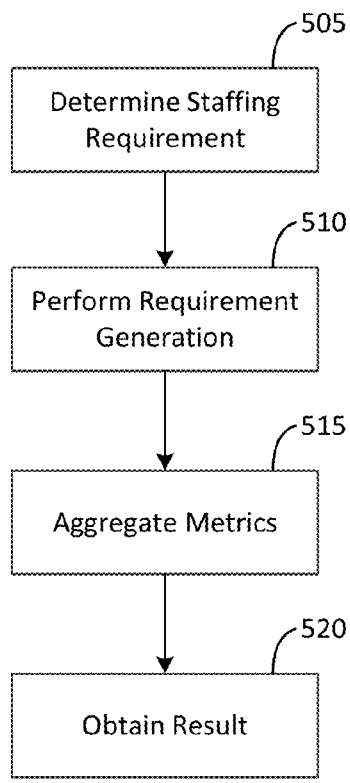
FIG. 5 illustrates an embodiment of the staffing requirement process executed by a network configuration optimization system.

FIG. 5 illustrates an embodiment of the staffing requirement process executed by a network configuration optimization system as indicated generally at 500.

In operation 505, the staffing requirement is determined. In an embodiment, for each interval input, performance metric goals, average handle times and volume for each of the intervals, the staffing requirement is determined based on target goal metric(s) of each of the simulation models from the process 300. Each model is associated with a particular contact type. Control is passed to operation 510 and the process 500 continues.

In operation 510, requirement generation is performed. For example, the contact type level staffing requirement results from operation 505 are processed by requirement generation linear programming. In an embodiment, the following inputs are used for staffing requirement generation: Number of Interaction Volume and Average Handle Time by Contact/Interaction Type for each interval input, Routing Profile, an interval of time Staffing Profile (e.g. day, week, month, etc.), Target Performance Metric, Target Performance Metric Goal by Contact/Interaction Type, and the Time Interval Minimum/Maximum Capture Rate Profile by Contact/Interaction Type to Staff Type.

The Number of Interaction Volume and Average Handle Time by Contact/Interaction Type for each interval input may be used by a simulation model to search for the staffing requirement number by contact type, which in turn will be used to allocate across the staff type(s) that can handle the contact type.

The Routing Profile may describe who handles which interaction. The Routing Profile may also include staff type grouping and definition. The Routing Profile may be equal for every interval input or each interval input may have a unique profile. The underlying process in short term planning/scheduling often varies in terms of routing. For example, calls routed at 8 AM may have a very different routing profile than calls routed at 10 AM (i.e. some arcs are missing). Thus, different routing profiles may be needed for every interval. In a steady-state system, such as long term capacity planning solutions, how calls are routed is typically similar, if not the same.

The Interval of Time Staffing Profile may describe the average historical (or user defined) staffing by staff type for each interval of the week. In an embodiment, this information is needed in order for a selection of staffing mix results that are similar to the input staffing profile (i.e., the smallest group remains the smallest). Results may be generated by averaging available staff by an interval of time (such as weekly or monthly) over an historical ACD date range. For example, the profile for 8 AM on Monday may comprise the average of the staffing of the previous 4 weeks of Mondays at 8 AM.

The Target Performance Metric may indicate which of the three available performance metrics (i.e., service level, ASA, abandon rate, etc.) are being determined.

The Target Performance Metric Goal by Contact/Interaction type may comprise the goal for which the staffing requirement is generated (e.g. 80% SL for C1, 75% SL for C2, etc.).

The Weekly Interval Minimum/Maximum Capture Rate Profile by Contact/Interaction type to Staff Type may be used to simulate agent preference, especially when the assumption is that handle times are the same at the contact type level (i.e. no matter who handles the call, the handle time remains constant). The Capture Rate Profile may be specified in a range of 0-100%. The capture constraints may be generated by querying the minimum and maximum capture rates over a range of historical ACD data for each interval of the week in the historical ACD data. For example, the Capture Rate Profile for 8 AM on Monday is set to be the historical minimum (and maximum) of the past five Mondays at 8 AM.

In an embodiment, all of the contact to staff arcs should have minimum and maximum constraints that intersect. The sum of the minimums (of all the arcs connecting to the contact type) is less than or equal to 100%. The sum of the maximums is greater than or equal to 100%. In a non-limiting valid example, Contact A handled by staff 1 (represented as A-1) is [0-30] and contact A handled by staff 2 (represented as A-2) is [60-90]. The sum of 30% and 90% exceeds 100% and the sum of 0% and 60% is less than 100%. The following example would not be valid where [0-30] for A-1 and [40-60] for A-2 because the sum of 30% and 60% is less than 100%.

In an embodiment, the requirement generation process may be performed at an interval of time, such as the weekly or monthly level. In an embodiment, weekly or monthly distributions for each of the input values are defined. This information may be derived from historical interval ACD data. The requirement to achieve a certain performance goal needs to be determined at the time interval level. For example, the requirement generation process evaluates whether adding 10 weekly staff is enough to reach a goal. If it is not, some additional weekly staff are added, distributed to the interval by the distribution, and then it is again determined if the performance goal has been achieved (aggregated back to the weekly level).

The process utilizes staff for each staff type by applying similar ratios with respect to the available staff for exact contact level requirement. In an embodiment, the following mathematical representation is the same for every interval input:

Minimize $HNOR-LNOR+99((\Sigma_j NOR_j * ASt_j)/(\Sigma_j ASt_j))$ where HNOR represents the highest staff ratio, LNOR represents the lowest staff ratio, $NOR_j$ represents the ratio of used staff to the staffing profile for staff type j, and $ASt_j$ represents the available staff of staff type j.

An objective is to minimize the highest staff ratio as well as the gap between the highest staff ratio and the lowest staff ratio. The definition may also minimize the penalty of not hitting capture rate constraints.

Constraints may be added. In an example of a constraint, for each staff type j, let staff type j handling all contacts equals available staff for type j multiplied by new/old available staff ration be defined by the following mathematical equation:

$$\frac{X_{i,j,k}}{Con_{i,j,k}} \leq P_{j,k} \times ASt_j \forall\ j \in Staffj$$

$$\text{and } \sum_k P_{j,k} = NOR_j \forall\ Staffj$$

where $X_{i,j,k}$ represents the number of staff of staff type j handling contact type i in state k, $Con_{i,j,k}$ represents the concurrency of contact type i, in state k of staff type j, $P_{j,k}$ is the Probability of $State_k$ of staff type j happening, $ASt_j$ represents the available staff of staff type j, and Staffj represents staff of staff type j.

In another example, for each contact type i, let contact type i handling by all staff types equal the requirement for contact type be defined by the following mathematical equation:

$$\Sigma_k X_{i,j,k} = X_{i,j} \forall i \in Ct, j \in St$$

$$\text{and } \Sigma_{j \in St} X_{i,j} = Req_i \forall i \in Ct$$

where k represents an index for the $k^{th}$ state of staff type j, $X_{i,j,k}$ represents the number of staff of staff type j handling contact type i in state k, $X_{i,j}$ represents the number of staff of staff type j handling contact type i, i $\in$ Ct represents a contact of contact type, j$\in$St represents a staff of staff type, and $Req_i$ represents the staffing requirement at Contact i level.

In yet another example, NOR for each staff type must lie between LNOR and HNOR such that:

$NOR_j \geq LNOR$ and $NOR_j \leq HNOR$.

where HNOR represents the highest staff ratio, LNOR represents the lowest staff ratio, and $NOR_j$ represents the used staff ratio.

In yet another example, the ratio of staff type j handling contact type i and all the staff types handling contact i needs to lie between $C_{max}$ and $C_{min}$. Flexibility is given by CRNHPN and CRNHPX when it is virtually impossible to hit the capture rate constraint. This may be represented by the mathematical equation:

$$C\min_{i,j} \le \frac{X_{i,j}}{\sum_k X_{i,j}} \le C\max_{i,j} \forall i, j$$

Therefore, $$X_{i,j}(1-C\min_{i,j})-C\min_{i,j}*(\Sigma_{k\ne j}X_{i,k})\ge 0 \text{ and}$$

$$X_{i,j}(1-C\max_{i,j})-C\max_{i,j}*(\Sigma_{k\ne j}X_{i,k})\le 0$$

where $X_{i,j}$ represents the number of staff of staff type j handling contact type i, $C_{min}$ represents the minimum capture rate, $C_{max}$ represents the maximum capture rate and k is the index for $k^{th}$ state of staff type j, and $X_{i,k}$ represents the number of contact types i in state k.

Control is passed to operation 515 and the process 500 continues.

In operation 515, the metrics are aggregated. For example, once all of the staffing requirement generation is performed for all of the intervals, the contact-to-staff type metrics are aggregated into the staff type level for each interval (i.e. the output of the process is the number of optimal staffing for each of the staff or agent types). Control is passed to operation 520 and the process continues.

In operation 520, the result is obtained and the process ends. The resulting staffing requirement should be at the same level that the model is validated against (i.e. hourly level for hourly model).

Model Creation for Use in Performance Prediction

Data extraction, model creation, and parameter optimization of a model are critical to contact center analysis. Historical ACD data extraction, ETL processing, simulation model processing, and optimization of the model parameters (which are validated against the historical ACD data) may be performed in order to produce models that can be used as the basis for any predictive and/or prescriptive contact center analytic needs, such as in the processes described above.

In one embodiment, machine-learning capability may be added with a continuous feedback loop to evaluate the model accuracy against real-world data. Recreation of accurate contact center models can occur when the accuracy no long falls within the acceptable error-threshold.

Figure 6A:
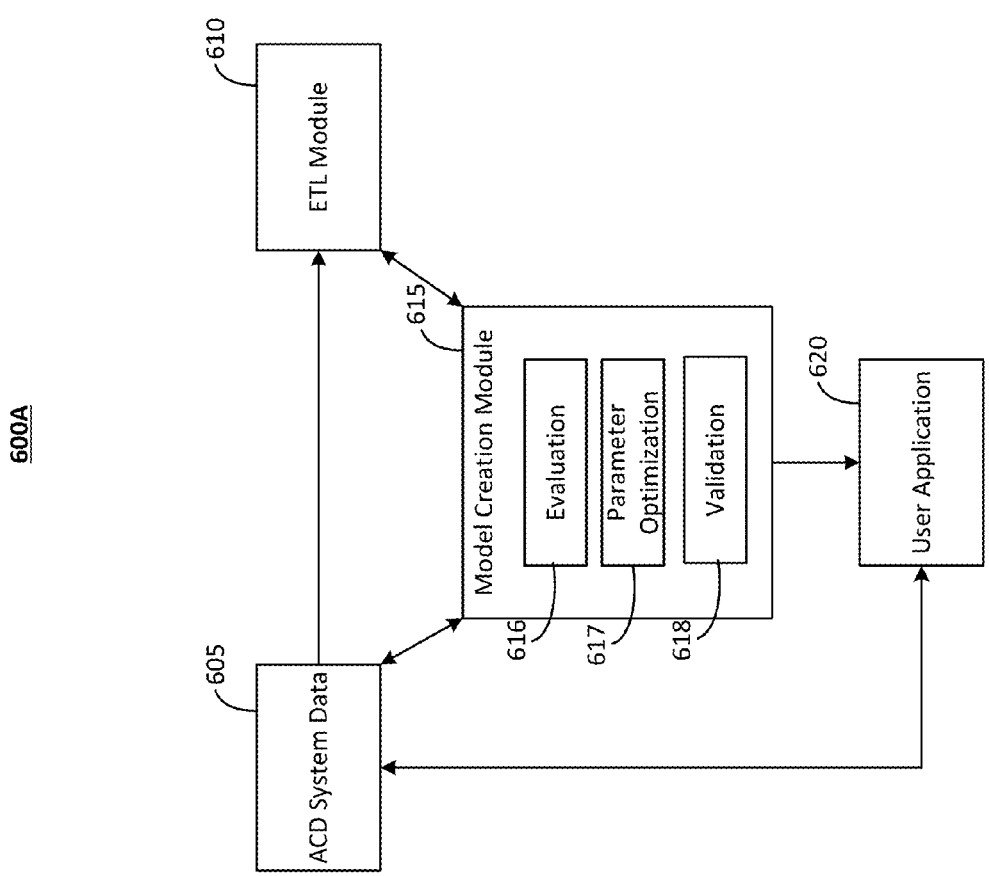
FIG. 6A is a diagram illustrating an embodiment of a model creation process executed by a network configuration optimization system.

FIG. 6A is a diagram illustrating an embodiment of a model creation process executed by a network configuration optimization system, generally indicated at 600A. The process may be operative in the Network Configuration Optimization System 205 (FIG. 2). A high level view includes an ACD System Data Module 605, a Historical Data ETL Module 610, a Model Creation Module 615, which may comprise modules for Evaluation 616, Parameter Optimization 617, and Validation 618, and a User Application 620.

The ACD System Data Module 605 may house historical ACD data, which is used by the ETL Module 610, the Model Creation Module 615, and the User Application 620.

The Historical Data ETL Module 610 may be an extracting module that processes key contact center service performance indicator metrics (or KPI metrics) from the ACD system data module 605 for performing an analysis. The ETL Module 610 may perform Extract, Transform and Load (ETL) processes on the ACD system data module 605, which are further described in FIGS. 7-10 below. KPI metrics of interest include Contact Volume, Contact Handle Time, Staff Available Time, Contact FTE, Speed of Answer, Contact Handled within Service Level Threshold (SLT), and Contact Abandoned.

In an embodiment, the Contact Volume metric may comprise the number of interactions that entered the system's ACD. The Contact Volume may exclude any short abandoned contacts.

The Contact Handle Time metric may comprise the total time that agents spend on an interaction during an interval. The contact handle time may include hold times and work performed after a call.

The Staff Available Time metric may comprise historical idle time that an agent is available to handle eligible interactions. Available time at the agent level should to be allocated because the entirety of the available time cannot be attributed to just one interaction or call type that the agent is handling. Methods of allocation may comprise: 1) Allocate using a number of interactions that an agent handles for each workgroup; 2) Allocate using time that agents spend for all of the interactions for each workgroup; and 3) Allocate using a predetermined or fixed ratio. Accounting for concurrency or multi-media interactions may also include allocating available time based on whether or not an exact concurrency is known. In an embodiment, concurrency may be defined as agents handling more than one interaction at a time. For example, an agent may be handling an e-mail when a chat window appears. The agent switches to handling the chat while the time counter is still ticking on the e-mail handling. The agent may move back and forth between the two interactions.

The Contact FTE metric may comprise the FTE time at the contact level. The FTE time may include the sum of the handle time spent by all agents handling a particular interaction in addition to any available time allocated.

The Speed of Answer metric may comprise the time that a particular interaction is waiting in the queue before being answered by an agent. The waiting time for an interaction that is abandoned before being answered may not be included in this metric. In an embodiment, this metric may be relevant for immediate work, such as inbound communications which may comprise phone calls or chats, to name some non-limiting examples.

The Contact Handled within SLT metric may comprise a contact that is handled within a predefined Service Level Agreement (SLA). The count is used to determine SL and may be expressed as a percentage of interactions being handled within a number of seconds. Hence, SL comprises the percentage of interactions that complied with the SLA of all the offered interactions. SLA information may be sourced from the ACD database or settings. In an embodiment, abandoned contacts are not complying with the SLA and not included in the SL calculation.

The Contact Abandoned metric may comprise the number of contacts that are abandoned while waiting in the queue. The count may be used to determine the ABN as a percentage of abandoned contacts of the total offered interactions. In an embodiment, calls that are abandoned after a short time in the system (or the queue), such as 2 seconds, may be excluded. Such abandoned interactions may be referred to as "short abandonments" and these contacts are considered never entered into the ACD system and as such, are excluded from the calculations of the abandon rate.

Figure 11:
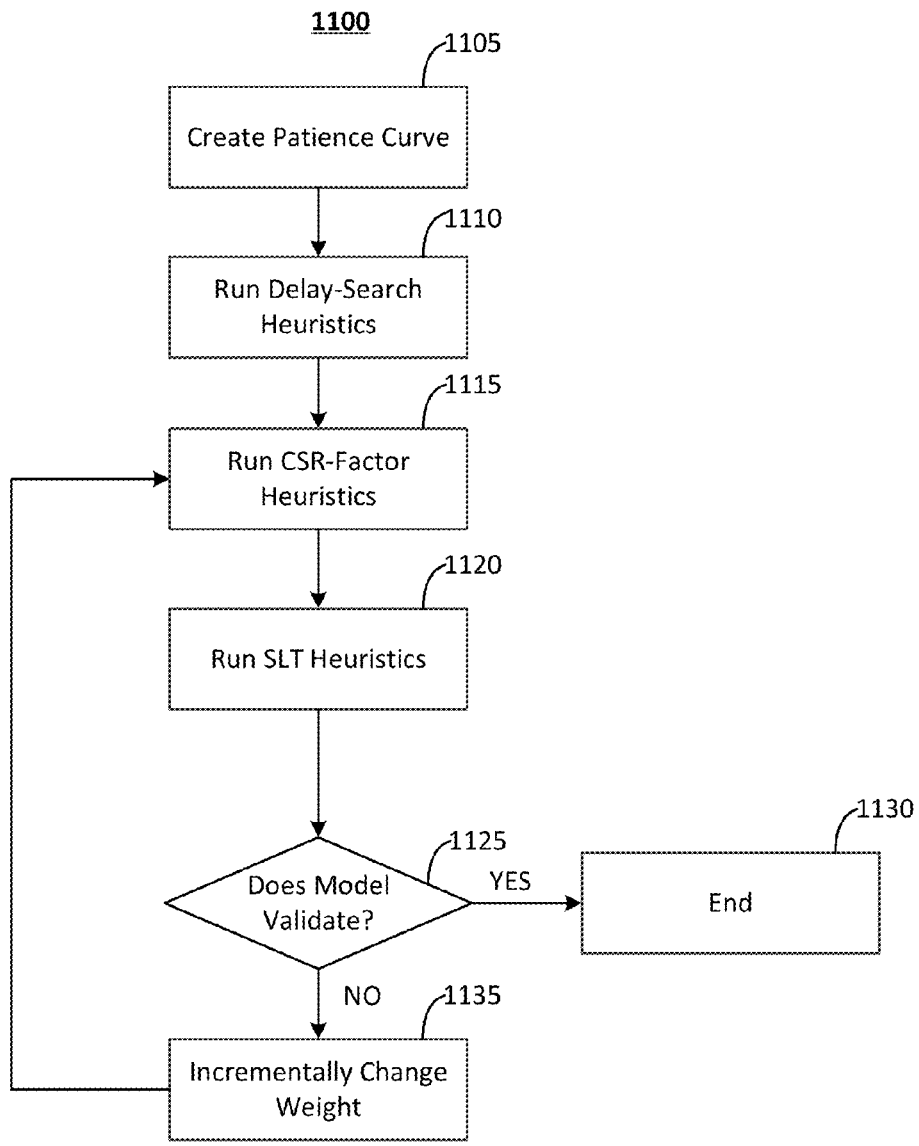
FIG. 11 illustrates an embodiment of a process for obtaining SLT parameters to determine service level, executed by a network configuration optimization system.

The Model Creation Module 615 may include modules for Evaluation 616, Parameter Optimization 617, and Validation 618. The Evaluation module 616 may be used to predict real world contact center service performance. The basis of the Evaluation module 616 may be that of a discrete event simulation model, or a closed form continuous simulation model. The Parameter Optimization module 617 may use data obtained from the ETL Module 610 to fine tune, or optimize, the parameters used by the Evaluation module 616. Such optimized parameters ensure that predicted contact center service performance metrics determined from the Evaluation module 616 closely represent the historical service performance values. Data obtained from the ETL module may be used to determine the Performance Metrics Error Weight Factor, the Patience Curve, Delay, the Customer Service Representative (CSR) factor (also referred to as a "Staff Factor"), and the SLT, which is used in validation 618. FIG. 11 describes the determination process in greater detail below.

The Performance Metrics Error Weight Factor may comprise Performance Metrics such as SL, ASA, and ABN. The weight factor may define the given priority of the performance metrics when calculating the combined error of the Analytic Module 616 when compared to historical performance metrics.

The Patience Curve may comprise a custom cumulative distribution profile that describes the proportion of calls that are abandoned as wait time progresses. The curve may serve as a profile of how patient a customer is before abandoning their interaction and may be used by the Evaluation Module 616 to define the relationship between ASA and Abandon Rate. In an embodiment, the patience curve parameters do not change during parameter optimization.

Delay comprises an amount of predetermined time that a caller waits before being queued to an agent. Examples of such predetermined time may include switch network delay, accounting for an IVR system, etc. The Evaluation Module 616 may use delay to adjust the simulated ASA to better reflect historical occurrences. In an embodiment, the delay parameters do not change during parameter optimization.

The CSR factor may comprise a multiplier parameter that is used to adjust the FTE staff number by the Evaluation Module 616. It may also be used to compensate for any unaccounted time that agents spend on calls, such as unaccounted available time, unaccounted time where someone else from other agent types are helping the groups, and the time is not allocated accordingly, etc.

The SLT may differ from the historical threshold in that it is adjusted to compensate for any unaccounted time that agents spent on interactions. The adjusted SLT parameter may be used by the Evaluation Module 616 to determine the Service Level.

The User Application 620 may be the application by a user for analytics in a contact center, especially with short term forecasting, long term scheduling, and vacation planning, to name a few non-limiting examples. In short term forecasting, the staffing requirement generated may aid in allocation of skill/staff for a contact type and the intra-day scheduling of agents in which to maximize contact center performance. In long term scheduling, the staffing requirement aids in generating long term strategic planning, including hiring, training of agents according to changes in business needs, etc. For vacation planning, better insight is achieved into the staffing need/requirement for the contact center, such as the availability of vacation slots per agent group. Intra-day/Intra-week monitoring and "what-if" analysis can benefit from user application 620. Calculation and estimation of contact center performance (SL, ASA, and ABN) may be performed with a set of inputs (contact volume, AHT, and Staff FTE). Immediate visibility to changes in the business environment can also be achieved, such as change of agent schedule, impact of agent cross-training, changes in agent efficiency, etc.

Figure 6B:
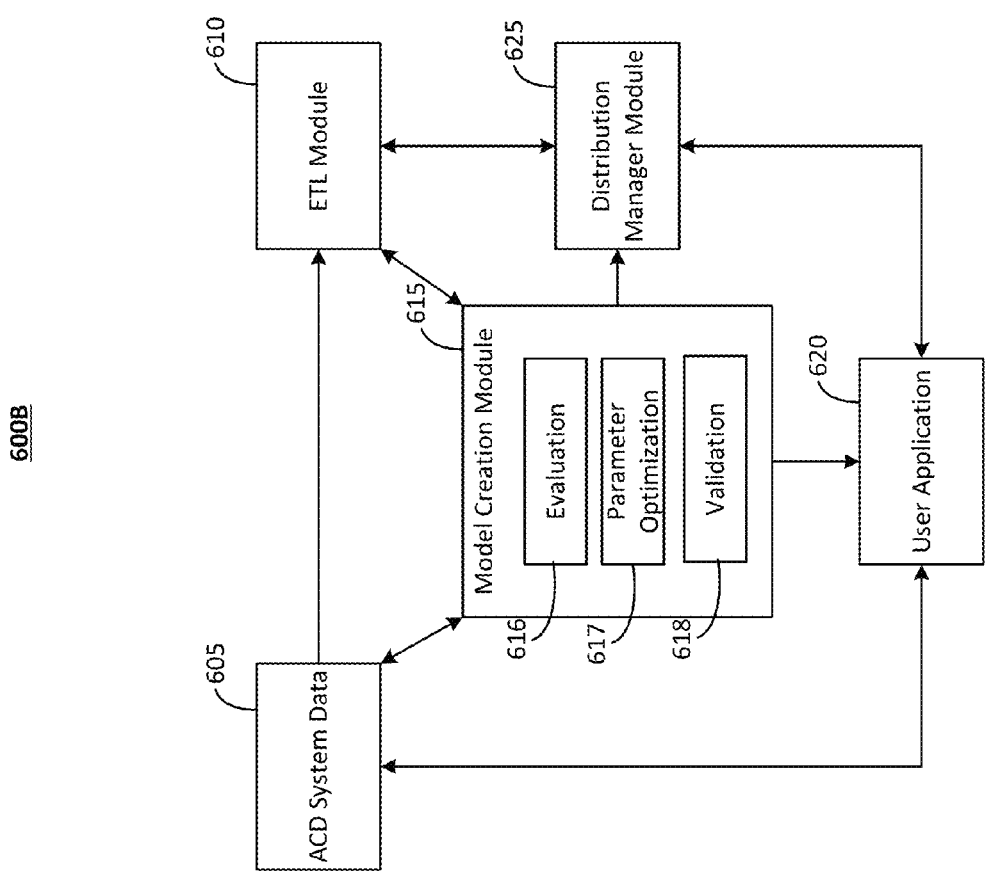
FIG. 6B is a diagram illustrating a modified embodiment of a model creation process executed by a network configuration optimization system.

FIG. 6B is a diagram illustrating a modified embodiment of model creation process executed by a network configuration optimization system, generally indicated at 600B. A modified embodiment may comprise the same elements presented in FIG. 6, as well as the addition of a Distribution Manager Module 625. The Distribution Manager Module 625 may be utilized in scenarios where the planning intervals of time differ from the intervals of time used to build and validate the model from the Model Creation Module 615. Historical data from the ETL Module 610 and the optimized model parameters from the Model Creation Module 615 may be passed into the Distribution Manager Module 625 to determine the distribution that best fits the virtual representation of the historical environment at different time intervals. In an embodiment, the Distribution Manager Module 625 produces and saves: (1) the intra-day, intra-week call volume arrival distribution; (2) the intra-day, intra-week average handle time distribution; and (3) the intra-day, intra-week agent availability distribution.

Results may be expressed in percentages and may be derived from several methods such as from actual historical data, curve-fitting, and average values or moving averages. The process of deriving a distribution is further described in FIG. 20 below.

Figure 7:
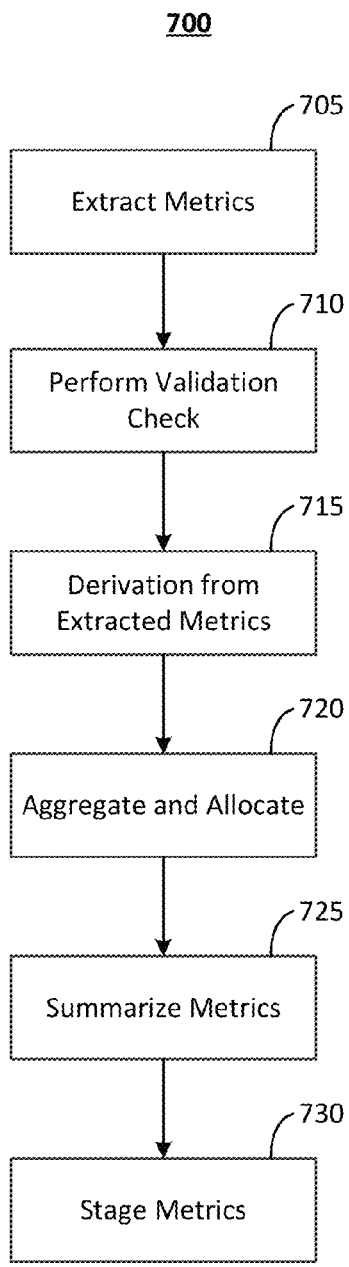
FIG. 7 illustrates an embodiment of a process for the ETL process executed by a network configuration optimization system.

FIG. 7 illustrates an embodiment of a process for the ETL process executed by a network configuration optimization system, indicated generally at 700. The process 700 may be operative in the ETL Module 610 of the system 600 (FIG. 6). The ETL Module 610 may perform Extract, Transform and Load processes on the ACD System Data Module 605.

In operation 705, metrics are extracted. For example, historical contact center KPI metrics are extracted from the ACD System Data Module 605 into temporary tables with predefined start and end periods. Such KPI metrics may include the interaction type, staff type, interaction volume, wait time, handle time, call abandoned, etc. Control is passed to operation 710 and process 700 continues.

In operation 710, a validation check is performed on the extracted metrics. For example, a search for missing data may be performed, the format of the data may be checked, and logical validation may be performed. Operations 705 and 710 may be considered part of the Extraction phase of the ETL process. Control is passed to operation 715 and process 700 continues.

In operation 715, derivation is performed. For example, contact types and agent types may be derived from the extracted metrics. In an embodiment, staff type may be derived from dimensional layers such as line of business, skills definition, and media type. Staff types of each agent may also be derived from the extracted metrics. For example, the staff type may be derived from the dimensional layers such as the routing definition of contact types the agent handled, the line of business, skills, or teams of such agent at a particular level. Control is passed to operation 720 and process 700 continues.

In operation 720 the metrics are aggregated and allocated. For example, the aggregating and allocation of metrics may be performed according to interaction and agent types. KPIs may be aggregated with respect to the granularity of the contact type and the staff type by calculation of the number of contacts handled. The determination is made by subtracting the contacts abandoned from contact volume. Where there is no concurrency or multi-media utilization, the allocation of available time from the staff type level to the contact level may be performed as follows:

In one example, intervals where the communication is handled and the handle time is zero, but with available time, the interval (e.g. daily) comparable handle time ratio, such as the population handle time ratio, may be used such that the ratio is represented as:

Ratio of Agent $Y$ handling contact type $A =$ $$\frac{\text{sum of population handle time of Contact}}{\text{sum of population handle time of ALL Contact}}$$
$$\text{types of Agent } Y \text{ (i.e. across all Agents)}}$$

No concurrency is assumed in this example. 'ALL' contact types may comprise several different contact types that Agent Y can handle, such as Contact types A, B, and C, for example. Thus, the ratio comprises the sum of the population handle time of a specific contact type (such as A) over the total population handle time for all of the contact types (A, B, and C) that Agent Y can handle.

'Population' comprises of all agents that are able to handle the contact type. This is used as a proxy because of the unavailability of the handle time record for an agent handling the specified contact type.

In another example, the agent's interval handle ratio may be used for intervals where the communication handled is greater than zero and the total handle time is greater than zero, or intervals where the contacts handled is equal to zero and the handle time is greater than zero. In this example, there exists handle time information for Agent Y handling contact types A, B, and C. The interval handle ratio may be represented as:

Ratio of Agent $Y$ handling Contact Type $A =$ $$\frac{\text{sum of handle time of Contact Type } A \text{ of Agent } Y}{\text{sum of Handle Time of All Contact Type of Agent } Y}$$

The 'Interval Handle Time of All Contact Type of Agent Y' (or the sum of handle time A, B, and C by Agent Y) must be greater than zero.

In an embodiment, an agent may only handle one contact type. When there are intervals with this scenario, the ratio is equal to 1.

In another embodiment, agents may only handle e-mail related interactions. The available time will be allocated within all of the e-mail contact types.

In another embodiment, agents may handle more than one contact type/interaction, including e-mail. In this scenario, none of the available time will be allocated to e-mail. However, multi-media scenarios may occur where concurrency is known.

When concurrency is known, as in the following example, the following may be applied. Agent A can handle one call and up to two e-mails at any time. Agent A can handle calls from CT1 and CT2 and e-mails from CT1. For a given period such as a 30 minute interval, Agent A handled five calls and answered five e-mails. Time spent on each call may be represented as tTalkACD (FIG. 8), and Agent A available time for the 30 minute interval is 50 seconds. The table 800 is representative of Agent A for available time allocation and call level FTE calculation. Since Agent A can handle, in this example, only one call either from CT1 or CT2, the available time is allocated for both contact types. The available time may be determined as 50 seconds multiplied by 500/(500+ 600) which is the 50 second available time multiplied by the daily handle time ratio determined from the tTalkACD data in Table 8. Thus, the available handle time for CT1 by Agent A is 22.73 seconds. Agent A can also handle calls and e-mails at the same time; however, available time is not allocated to e-mail because it is deferrable. Since the available time that a typical ACD collects is the time where an Agent is completely available, the actual available time for the agent to handle additional calls while it is handling e-mails may be undercounted, and vice versa.

When concurrency is not known, it can be estimated from the historical ACD data. Specifically concurrency may be determined using the mathematical equation:

$$\text{Estimated Concurrency} = \frac{tTalkACD}{tAgentOnACDCall}$$

where tTalkACD represents the sum of interaction time an agent spends on each ACD interaction while the tAgentOn-ACD Call represents the sum of concurrent time an agent spends on all ACD interactions. For example, using a 60 second span, an agent handles three ACD interactions concurrently. tTalkACD=3*60=180 and tAgentOnAcdCall=60. Thus, the Concurrency is (180/60), or 3.

Using the same Agent A from the previous example, Agent A can handle one call and up to two e-mails at any time. Agent A can handle calls from CT1 and CT2 and e-mails from CT1 (FIG. 9). For a given period 30 minute interval, Agent A handled five calls (two from CT1 and three from CT2 as shown in Table 900) and answered five e-mails. Time spent on each call and e-mail is represented as tTalkACD in the Table 900. Agent A's available time for the 30 minute interval is 50 seconds. Using the values and the estimated Concurrency equation:

Estimated Concurrency =

$$\frac{tTalkACD}{tAgentOnACDCall} = \frac{(500 + 600 + 2000)}{1100} = 2.8181$$

In this example, the estimated concurrency reflects that on average, the agent is handling 2.8182 interactions. The available time may be multiplied with the estimated concurrency in order to determine the adjusted available time allocation. Thus, 50 seconds×2.8181=140.91 seconds for an adjusted available time. The Contact Type CT1 from the Table 1000 shown in FIG. 10 may have an available time of 22.73 seconds. The adjusted available time is multiplied by the ratio of tTalkACD of 500 (obtained from FIG. 9) over the sum of the total handling time for the interaction (500+600+ 2000=3100). Thus, the available time for CT1 may be determined from the following:

Available Time=140.91×(500/3100)=22.73

In the third example, the interval number of contacts handled ratio may be used in intervals where the number of contacts handled is greater than zero and the total handle time is equal to zero. The interval handle time ratio may be represented as:

$$\frac{\text{Interval Number of Contacts}}{\text{Handled of Call Type } X \text{ of Agent } Y}$$
$$\frac{}{\text{Interval Number of Contacts}}$$
$$\text{Handled of All Call Type of Agent } Y$$

Available time may be allocated using this ratio.

Referring back to operation 720 (FIG. 7), aggregation of the contact type level FTE is performed. This may be determined from the summation of handle time of all agents spent handling a particular contact type and the available time allocated at the CT level. Averaging of the Speed of Answer to Average Speed of Answer (ASA) and Handle time to Average Handle Time with respect to the number of contacts handled is performed. Finally, the percentage of calculation of SL and abandon rate is performed. Operations 715, 720, and 725 comprise the transforming stage of the ETL process. Control is passed to operation 725 and process 700 continues.

In operation 725, metrics are summarized. For example, a final consolidated table with aggregated KPIs (Contact Volume, AHT, Contact Type Level FTE, SL, ABN, ASA, etc.) may be created and summarized to the contact type level and a predetermined time interval. The time interval may be in minutes, hours, days, weeks, etc. Control is passed to operation 730 and process 700 continues.

In operation 730, the summarized metrics are then staged for access by the Model Creation Module 615. Operation 720 comprises the loading stage of the ETL process. The process ends.

FIG. 11 illustrates an embodiment of a process for obtaining SLT parameters to determine SL executed by a network configuration optimization system, indicated generally at 1100. The process 1100 may be operative in the Model Creation Module 615 of the systems 600A and 600B (FIGS. 6A and 6B).

In operation 1105, a patience curve is created. For example, the patience curve may be created using the staged KPI metrics (e.g. ASA, ABN, etc.) from the ETL Module 610. The patience curve may be defined by a list of patience profiles. The patience profiles, in an embodiment, may be expressed as ranges of ASA corresponding to a cumulative percentage of the ABN and a Triangular Distribution forming a Cumulative Distribution Function (CDF) explaining the relationship between ASA and ABN.

Figure 12:
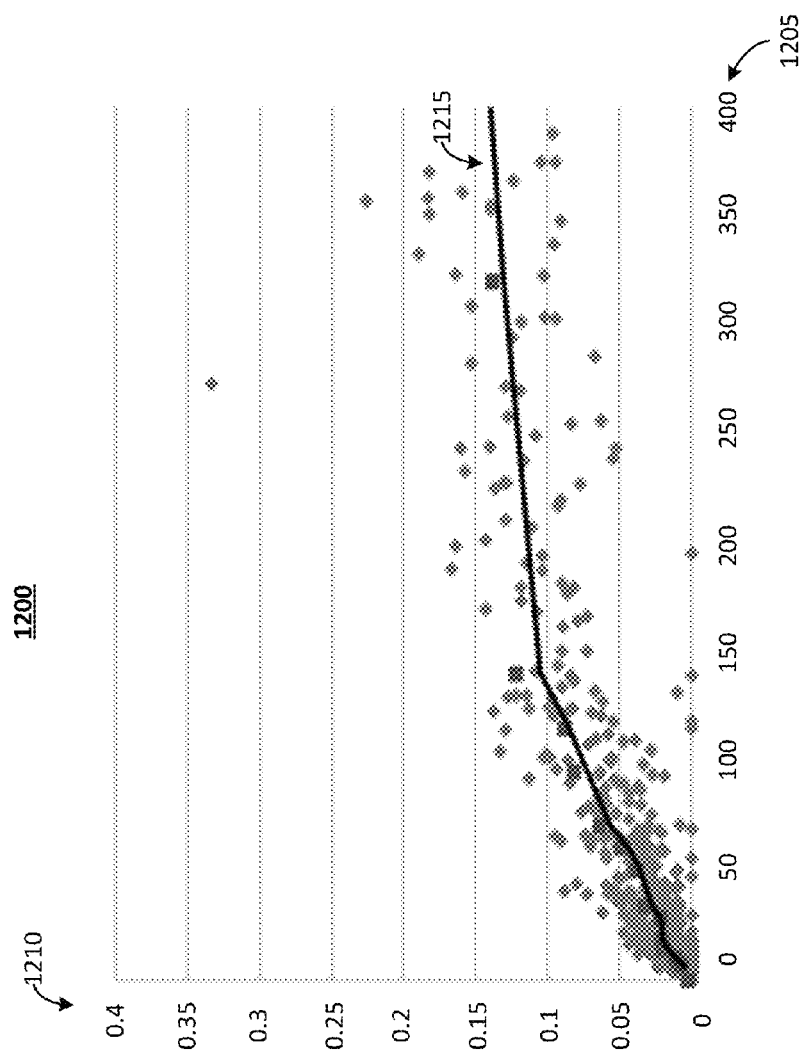
FIG. 12 is an embodiment of a distribution scatter plot.

An Abandon Rate vs. Average Speed of Answer Cumulative Distribution scatter plot may be derived from the available historical ACD data as exemplified in FIG. 12. The vertical axis 1210 displays ABN values and the horizontal axis 1205 displays ASA values. Each segment of the scatter plot is approximated using a CDF of uniform distribution. In an embodiment, each segment's distribution parameters (i.e. lower bound and upper bound) are estimated using a weighted least-square-error regression method. The same technique is recursively executed as the algorithm traverses the entire ABN-ASA cumulative distribution spectrum from left to right. A piece-wise multi-segment linear function 1215 results in the graph 1200. The function may be used to approximate the polynomial curves describing the relationship of how patient the customers are until abandoning their interaction. An extrapolation of the customer patience profile may be performed in the absence of historical ACD data.

Triangular distribution may be used to model the region beyond the multi-segment abandon profile, as shown in FIG. 13. The distribution 1300 shows the triangle where the value a represents the maximum ASA of the Abandon profile 1305, c represents the maximum ASA of historical actual values 1320, and b represents the maximum of the triangular distribution 1310. The height of the triangle, 1315, may be represented by x, as well as the distance between a and c. The height 1315 is determined from the area of the triangle such that the ASA=ABN at point c−ANB at point a. The Maximum of the distribution 1310 may be determined by x=2/(b−a) solving for b.

FIG. 14A displays an example of patience curve parameters in table form 1400A. FIG. 14B displays the triangular distribution results in table form 1400B. Once the patience curve has been derived from the data as described, the distribution profiles will be combined for use as one of the parameters consumed by the Evaluation Module 616. Control passes to operation 1110 and the process 1100 continues.

Figure 15:
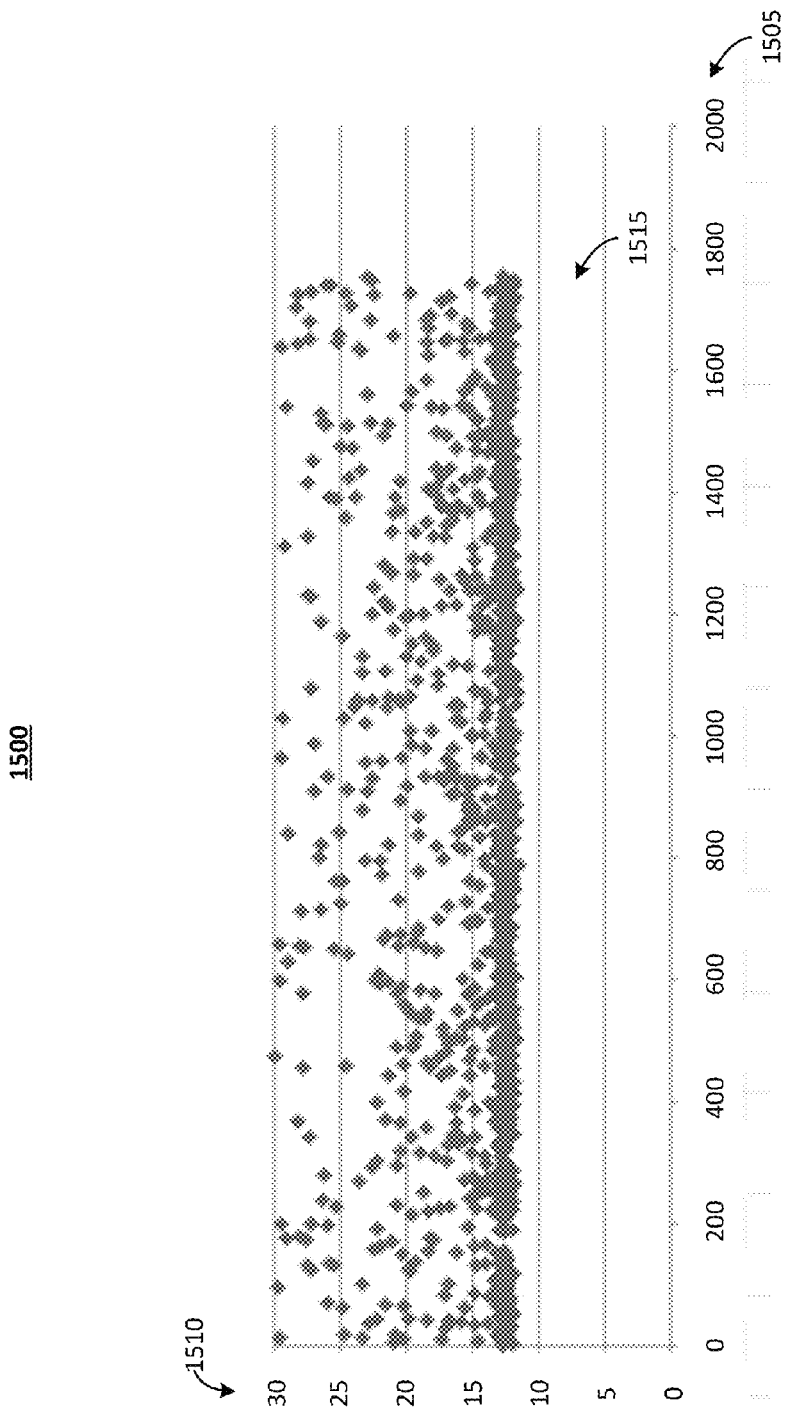
FIG. 15 is an example chart of ACD data exhibiting delay.

In operation 1110, delay-search heuristics are run. In an embodiment, the delay parameter may be determined by applying predefined heuristics on data from the Historical Data ETL Module 610. A predetermined amount of time that a customer would have to wait (or be made to wait) before their interaction is answered may be modeled. FIG. 15 is an example chart 1500 of ACD data exhibiting delay. The vertical axis 1510 represents time in seconds while the horizontal axis represents a time series 1505. The lowest bound of historical ACD data on ASA is about 12 seconds (1515). This suggests that an automated message lasting 12 seconds is played in the IVR system before the interaction is placed on a queue to be routed or handled by an agent. The speed of answer may be measured when the IVR message starts playing, explaining the floor value of 12 seconds 1515.

Figure 16:
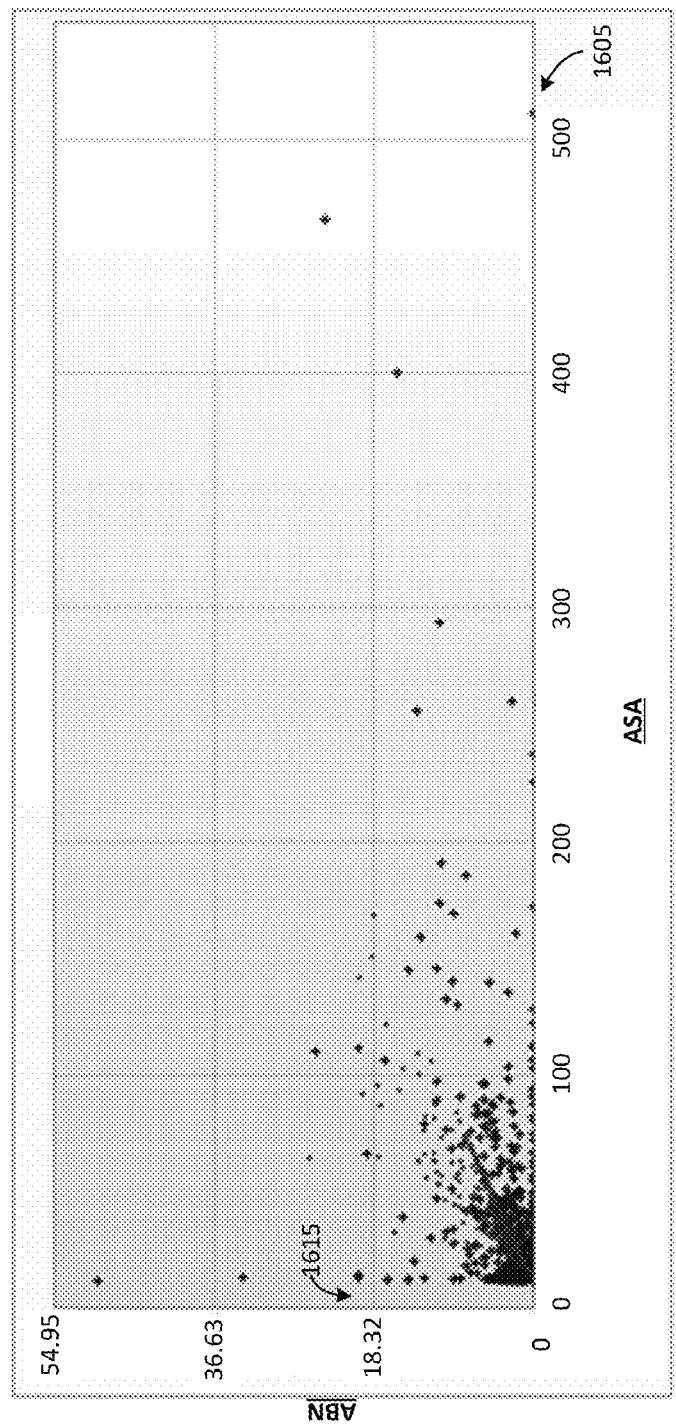
FIG. 16 illustrates an embodiment of a patience curve exhibiting delay.

FIG. 16 illustrates a patience curve 1600 exhibiting the delay using the data exhibited in FIG. 15. A gap in the Average Speed of Answer can be seen 1615 on the horizontal axis 1605.

Figure 17:
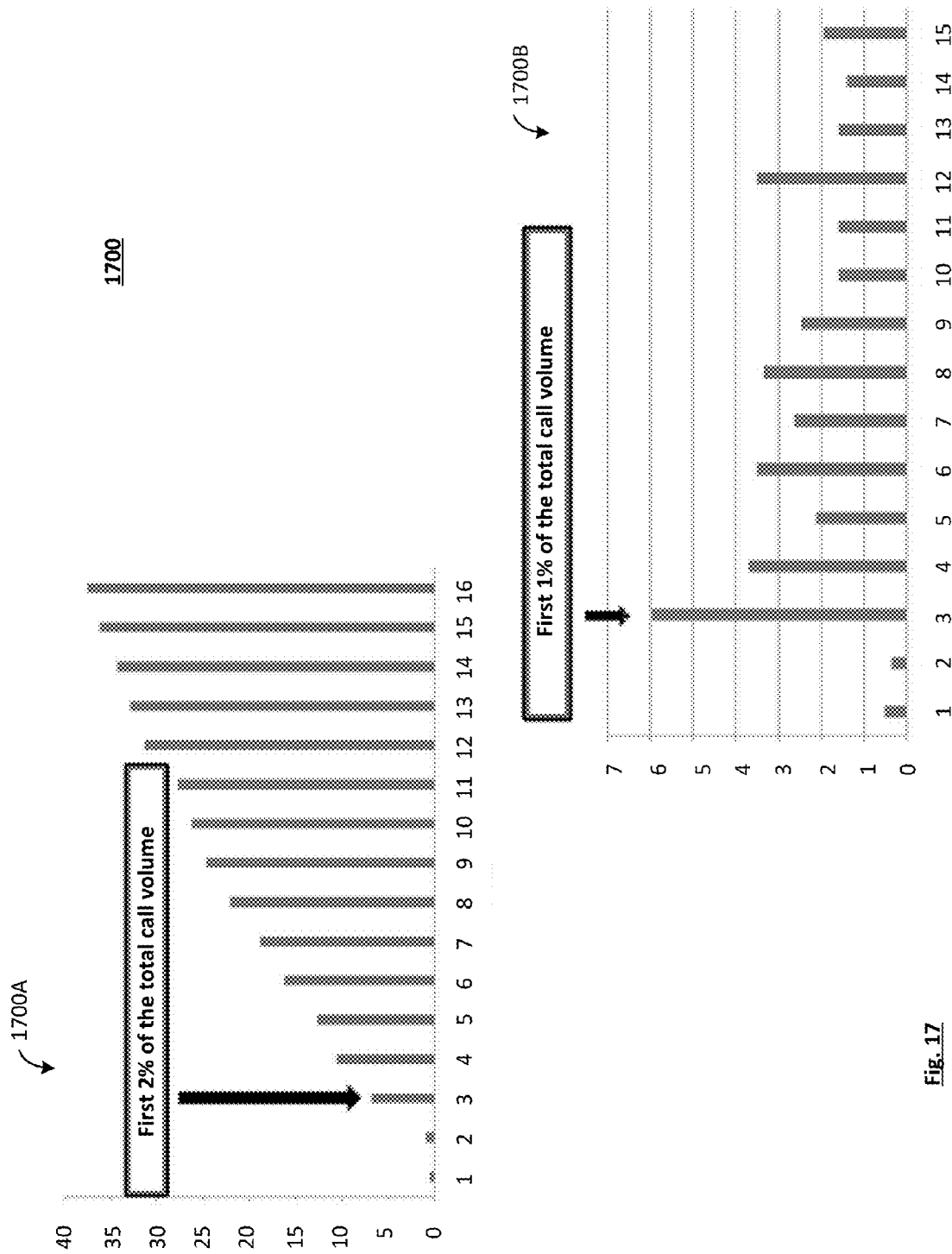
FIG. 17 illustrates an embodiment of a cumulative histogram and an embodiment of a histogram exhibiting total interaction volume.

The delay heuristic may be determined by first finding the ASA in which the first 2% of the total interactions are handled. The determination may be made from a cumulative histogram 1700A of the total interaction volume, which is exhibited in FIG. 17. Between zero and the smallest value for the ASA, where the first 2% of the interactions are answered, the first interval which meets at least half of the first 2% interactions is found. If there is none, then it is assumed that there is no delay since there is no significant concentration of ASA that suggests such delay exists. FIG. 17 illustrates a histogram 1700B of the total Interaction volume. After the delay is found, it will be stored as a parameter and used to adjust the ASA in subsequent use in the continuous simulation model. Control is passed to operation 1115 and process 1100 continues.

In operation 1115, CSR-Factor heuristics are run. The CSR factor and SLT are found by iteratively feeding historical ACD data into the Evaluation Module 616 and changing the parameters to minimize the combined error between the performance output from the Evaluation Module 616 and the historical ACD data.

A two-step approach may be used to optimize the CSR factor parameter. In the first search, the objective is to obtain the lowest point and the upper point that will bind the range in which includes the optimal CSR factor. In an embodiment, the optimal CSR factor minimizes the errors between historical ACD Queue Performance Statistics (QPS) and predicted QPS values. In another embodiment, a default CSR factor of 1 may be used to start the search running on a closed form simulation model. The error function is computed using the default priority weighting for ASA error and ABN error. The error function may then be compared to the simulated QPS values against the historical QPS values for ASA and ABN. If the resulting simulated ASA and ABN metrics are above the historical ACD values, then the current set of calculation parameters to the simulation model is less efficient than it should be historically. Therefore, a set increment (e.g., 0.1 per iteration) may be added or subtracted to the previous CSR factor.

Figure 18:
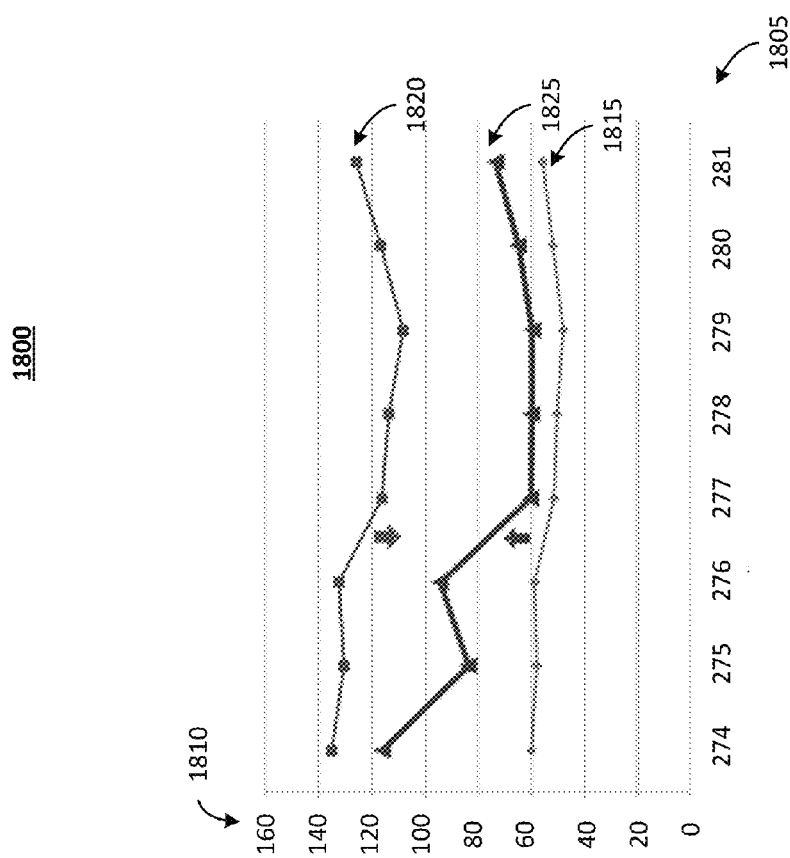
FIG. 18 illustrates an embodiment of CSR factor parameter search.

Incrementing or decrementing may be performed until the simulated ASA and ABN are below the historical ACD data values. The search stops when the lower and upper CSR factor bound is determined. FIG. 18 displays a graph 1800 exhibiting the results for the lower factor 1820 and the upper factor 1815. The horizontal axis represents a time interval 1805 and the vertical axis 1810 represents the ABN or ASA. In this example, ASA is displayed. The actuals are represented as 1825. A stopping criterion may be set to the CSR factor. For example, an upper bound of 4 and a lower bound of 0.1 may be used. In an embodiment, a typical CSR factor would range between 0.5 and 1.5.

In the second step of the approach, another search may be performed and the exact CSR factor value is determined. In one embodiment, the range may be divided into blocks of smaller CSR factors and the error functions evaluated. Alternatively, a binary search may be performed to determine the optimal CSR factor.

In embodiments where a contact type is being evaluated that does not possess or exhibit abandonment, an Erlang-C model may be used as opposed to the continuous simulation model. Where there is no abandonment, a patience curve or delay may not need to be determined. Only the CSR factor and the SLT are optimized in achieving the minimum Performance Metrics Error with different weight factors for SL and ASA. Thus, the process may be similar to the process for the immediate work model as described above.

In operation 1120, SLT heuristics are run. In an embodiment, two-step approach may be used to optimize the SLT parameter. In the first step, a search is performed to obtain the lowest and the upper-most point that will bind the range in which the optimal SLT is located. The optimal SLT minimizes the error functions of the Service Level QPS when the historical SL is compared against the simulated SL.

Figure 19:
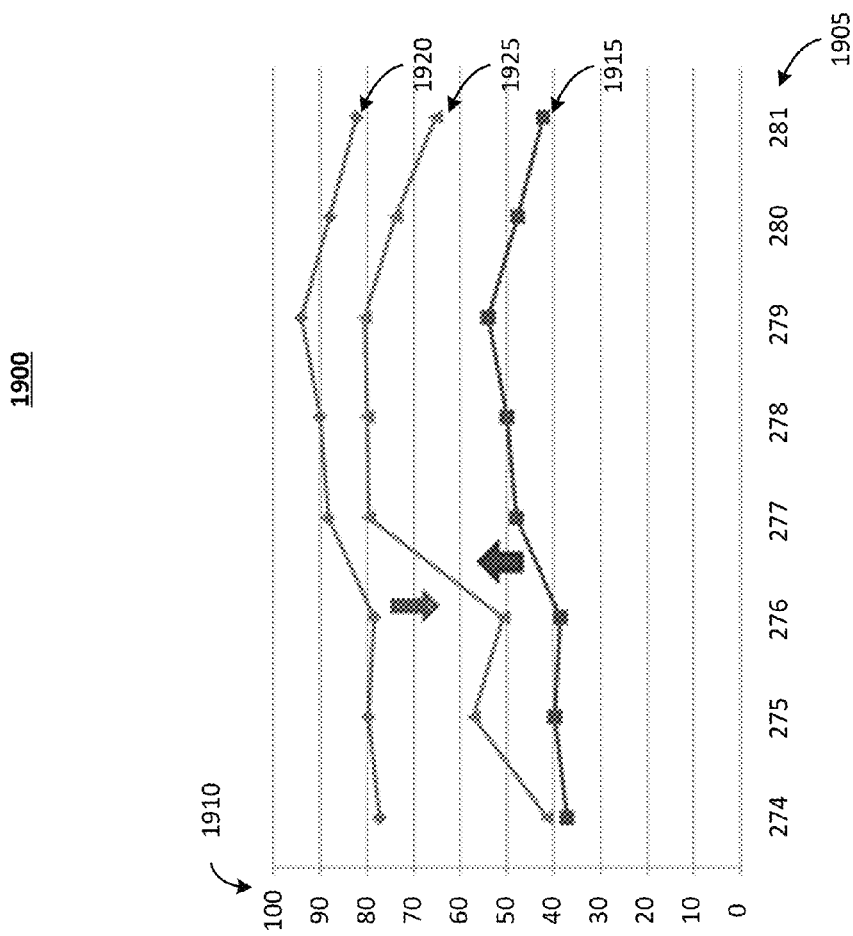
FIG. 19 illustrates an embodiment of SLT parameter search.

A closed form simulation model may be run using an arbitrary value (e.g. 60 seconds) and comparing the simulated SL metric to the historical actual SL. If the resulting simulated SL metric is above the historical values, then the closed form simulation model may be overestimating its threshold (i.e., more interactions are counted towards the SL than should be). Increments may be added or subtracted (such as 10 seconds per iteration, for example) to the previous threshold parameter and keep incrementing or decrementing until the simulated SL is below the historical ACD values. FIG. 19 displays a graph 1900 which exhibits the results for the lower SL 1915 and the upper SL 1920. The horizontal axis 1905 represents a time interval and the vertical axis 1910 represents the SL in a percentage. The SL actual values are represented by the line 1925.

In the second step, another search may be performed to determine the exact SLT factor value. The range may be divided into chunks of smaller SLT factors and the error functions evaluated, or a binary search may be performed to identify the optimal SLT parameter which minimizes the error function of the SL. The optimal SLT found using this process should closely resemble the actual threshold set in the ACD switch system, given that the ACD data is of high fidelity.

In an embodiment where contact types do not require immediate handling of interactions as described above (e.g., deferring or backlogging of contact volume), a deferred work model may be used. The threshold may be measured in time intervals of hours or days. The contact types may be modeled using a simulator that determines workload and iterates through the time in the planning scenario. The number of contacts being handled at each interval, the number of contacts being passed into the next interval as backlog, and the calculated service performance may be determined. In an embodiment, the SLA assumption used is always 100% within a designated time interval. For example, 100/24 may mean that 100% of e-mails are handled within 24 hours. The only parameter that is optimized may thus comprise the SLT with the target goal that is always 100%.

In operation 1125, it is determined whether or not the model has validated within the threshold. If it is determined that the model has validated within the threshold, control is passed to operation 1130 and the process 1100 ends. If it is determined that the model has not validated within the threshold, control is passed to operation 1135 and the process 1100 continues.

The determination in operation 1130 may be made through use of a QPS loop. For example, the QPS loop is a mechanism within the model creation process that iteratively evaluates the CSR factor and the SLT that will minimize the combined error function value of all QPS metrics (e.g. ASA, SL, and ABN) within a predefined error tolerance (typically 5% or less). If minimizing the simultaneous error functions is not achievable, the loop control will try to produce a CSR factor and SLT solution set that minimizes the error of any pairwise combinations of the QPS, i.e., ASA-ABN, or ASA-SL, or ABN-SL.

The pre-definition of an error-priority table that scores the importance of achieving a tight QPS prediction may be performed. For example, this may be akin to the business rule priority of the call center manager/planner. The manager/planner might prioritize a tight service level prediction as top priority, and less on ASA prediction and/or even less on ABN prediction. The business rule requirement may then translate to a QPS validation priority table such that (1) SL, (2) ASA, and (3) ABN apply. Other combinations of these may be generated as follows:

(1) SL, (2) ABN, (3) ASA
(1) ASA, (2) SL, (3) ABN
(1) ASA, (2) ABN, (3) SL
(1) ABN, (2) ASA, (3) SL
(1) ABN, (2) SL, (3) ASA

In at least one embodiment, only one combination needs to be specified for QPS loop control to use. The QPS error-priority table is translated to a weighting factor (i.e., like ranking of how important a QPS is against the others). That weight may be used in the following mathematical equation:

Error functions=[priority weight factor ASA]*error function(ASA actuals−ASA simulated)+[priority weight factor ABN]*error function(ABN actuals−ABN simulated)+[priority weight factor SL]*error function(SL actuals−SL simulated)

Heuristically, the QPS Loop Control becomes:
(1) Start with all QPS with equal error-function weight, then find the CSRF and SLT
(2) Evaluate if the error function of each QPS is within the acceptable error-tolerance, which may be 5%, for example.
(3) If the error function is within the acceptable error-tolerance, then the CSRF and the SLT are the solution.
(4) If not, then read in the QPS error-priority table.
(5) Increment, or decrement the CSR towards the direction that will improve the error function (i.e., lower absolute value), and run the SLT heuristics.
(6) Evaluate the error function again, is it satisfactory? (i.e., the top priority QPS and second priority QPS are within acceptable error tolerance?

(7) If yes, then stop and this CSRF and SLT are the solution.

(8) If not, then keep reducing the weight of the $3^{rd}$ priority QPS until the first 2 QPS achieve errors that are within the acceptable tolerance by searching the CSRF and SLT solution set.

(9) If none can be found when CSRF and/or SLT search hits its max upper bound (defined as 4 and 1000 respectively), then set the weight of the second and third priority QPS to zero.

(10) Then continue, then increment (or decrement) the CSR towards the direction that will improve the error function (i.e. lower absolute value), and then run the SLT heuristics. This CSRF and SLT are the solution.

In operation 1135, the weight is changed. For example, a combination of weights may be evaluated in order to determine the best combination that minimizes the validation error. In an embodiment, each weight's value is 0 to 1, thus giving a finite number of combinations. Control is passed back to operation 1115 and the process 1100 continues.

In scenarios where there is a discrepancy between the time interval in which a simulation model is generated and the time interval for which the forecast is generated, a distribution profile is necessary that enables the transform of inputs into small intervals.

Figure 20:
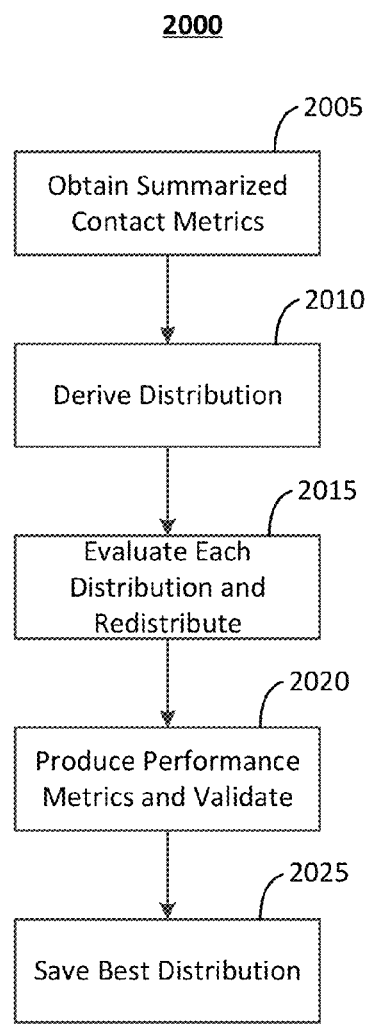
FIG. 20 describes an embodiment of a process for deriving a distribution executed by a network configuration optimization system.

FIG. 20 describes an embodiment of a process for deriving a distribution executed by a network configuration optimization system, indicated generally at 2000. The process may be operational in the Distribution Manager Module 625 of FIG. 6B.

In operation 2005, summarized contact metrics are obtained. The data may be obtained from the ACD system. In an embodiment, the historical data may be recently collected, such as after the current model creation process, or it may be previously collected during the previous model creation process. Control is passed to operation 2010 and operation 2000 continues.

In operation 2010, a distribution is derived. For example, the Distribution Manager Module 625 may derive the distribution profile from historical data from the summarized contact metrics. In other embodiments, the distribution may be derived from fitting a curve to historical ACD data. In yet another embodiment, the distribution may be derived from the average value of data in each set of time profile. A different weighting may also be assigned to earlier time periods and to later time periods to place more weight on either period. Control is passed to operation 2015 and operation 2000 continues.

In operation 2015, distributions are evaluated and re-distributed. For example, the Distribution Manager Module iteratively evaluates each distribution that has been selected from derived distributions. Historical data inputs (e.g., volume, AHT, and FTE) from the same time interval are changed to the validation time interval (such as daily or weekly), and redistributed using a selected distribution. Control is passed to operation 2020 and process 2000 continues.

In operation 2020, performance metrics are produced. For example, the Performance Prediction engine evaluates and produces performance metrics from the re-distributed interval inputs. The redistributed interval inputs may typically be hourly, but may also be in 30 minute or 15 minute intervals. In another embodiment, the Continuous Simulation Engine may be used instead of the Performance Prediction Engine for media such as inbound communications (e.g., phone and chat), Erlang-C for callbacks, deferred work engine for e-mail, casework and other deferred work. The performance metrics produced may include SL, ASA, and ABN at the interval level. The interval level is converted to the validation-interval level (such as daily or weekly) and the results are compared to the historical performance. Control is passed to operation 2025 and process 2000 continues.

In operation 2025, the designated distribution is saved and the process ends. For example, the designated distribution may comprise the distribution that provides the least error during comparison. This is saved for usage in the planning process.

Process 2000 may be revisited and changed in the course of developing and validating the contact center models. For example, when the inherent contact center model no longer validates with a newly entered forecast (or historical data), a new distribution can be chosen from a pool of saved distributions to fine-tune the contact center model. This is instead of recreating a new model, or re-optimizing the parameters of the inherent model.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for configuring a telecommunication network comprising a network configuration optimization system and an automatic communication distributor operatively coupled to a plurality of agent telecommunication stations in a multi-skilled contact center operation environment including a plurality of staff comprising a plurality of staff types, the method comprising the steps of:
   a. using the network configuration optimization system to build at least one model using predetermined input metrics for one or more respective queues maintained by the automatic communication distributor, wherein each of said models simulates behavior of the respective queue;
   b. using the network configuration optimization system to create a table for each of model built in step (a) by altering a staff count for the contact center in each model, wherein the table represents service performance of the contact center operation environment for the respective staff count as predicted by the respective model;
   c. using the network configuration optimization system to build an other model from the at least one model built in step (a), wherein said other model simulates how contacts in each of the one or more queues are routed within the telecommunication network and which of the plurality of staff types handles the contacts;
   d. using the network configuration optimization system to evaluate the service performance to determine if excess ones of the plurality of staff are available by performing a first linear programming formulation using the created table, wherein if excess ones of the plurality of staff are found to be available, creating a second linear programming formulation to allocate the excess ones of the plurality of staff to a selected one of the plurality of staff types according to the ratio of the staff types determined by the first linear programming formulation;

e. configuring the telecommunication network by assigning staff type designations to the plurality of agent telecommunication stations in accordance with the determination of step (d); and f. using the automatic communication distributor to route communications to the plurality of agent telecommunication stations in accordance with the staff type designations assigned to each of the plurality of agent telecommunication stations in step (e).

2. The method of claim 1, wherein said communications comprise one or more media types.

3. The method of claim 2, wherein said media types comprise one or more of: E-mail, phone, live chat, callbacks, back office work, video conference, SMS, and social media.

4. The method of claim 1, wherein the input metrics for a queue comprise one or more of the following: volume, average handle time, staff, routing profile, contact priorities, goals, target performance metrics, and target performance goals.

5. The method of claim 1, wherein the at least one model are built using closed form simulation.

6. The method of claim 1, wherein the staff type comprises at least one of: grouping of similar skills, teams, and departments.

7. The method of claim 1, wherein said altering of staff count comprises adding an additional staff.

8. The method of claim 1, wherein the one or more queues comprise a contact queue.

9. The method of claim 1, wherein the one or more queues comprise an interaction queue.

10. A method for configuring a telecommunication network comprising a network configuration optimization system and an automatic communication distributor operatively coupled to a plurality of agent telecommunication stations for predicting service performance and generating a staffing requirement from said prediction in a multi-skill network, including a plurality of staff comprising a plurality of staff types, the method comprising the steps of:

a. using the network configuration optimization system to build at least one simulation model using predetermined input metrics for one or more respective queues maintained by the automatic communication distributor, wherein the predicting is for a long term interval of time, determining a distribution demonstrative of a virtual representation of a historical environment of the network at different time intervals, wherein said determination comprises at least one of:
  i. selecting the distribution from among existing historical distributions;
  ii. deriving the distribution from fitting a curve on existing historical data; and
  iii. deriving the distribution from an average value of data in each interval of time profile;

b. using the network configuration optimization system to build at least one linear programming model to simulate how contacts in each of the one or more queues are routed within the telecommunication network and which of the plurality of staff types handles the contacts;

c. using the network configuration optimization system to create a service performance table for each simulation model built by altering the number of staff;

d. using the network configuration optimization system to evaluate the service performance to determine if excess ones of the plurality of staff are available by performing a first linear programming formulation, wherein if excess ones of the plurality of staff are found to be available, creating another linear programming formulation to allocate the remainder of the unallocated staff to a corresponding staff type according to the ratio of the staff types determined by the first linear programming;

e. configuring the telecommunication network by assigning staff type designations to the plurality of agent telecommunication stations in accordance with the determination of step (d); and f. using the automatic communication distributor to route communications to the plurality of agent telecommunication stations in accordance with the staff type designations assigned to each of the plurality of agent telecommunication stations in step (e).

11. The method of claim 10, wherein said network comprises one or more media types.

12. The method of claim 11, wherein said media types comprise one of more of: E-mail, phone, live chat, callbacks, back office work, video conference, SMS, and social media.

13. The method of claim 10, wherein the input metrics for a queue comprise one or more of the following: volume, average handle time, staff, routing profile, contact priorities, goals, target performance metrics, and target performance goals.

14. The method of claim 10, wherein the at least one simulation model of step (a) are built using closed form simulation.

15. The method of claim 10, wherein the staff type comprises at least one of: grouping of similar skills, teams, and departments.

16. The method of claim 10, wherein said altering of staff count comprises adding an additional staff.

17. The method of claim 10, wherein the one or more queues comprises a contact queue.

18. The method of claim 10, wherein the one or more queues comprises an interaction queue.

19. The method of claim 10, wherein the contact type requirement comprises the number of total staff required to achieve service goals for a specific contact type.

20. The method of claim 10, wherein the staff type requirement comprises the total requirement related to the contact type requirement.

21. The method of claim 13, wherein the performance metric goal comprises a routing profile that describes which interaction is handled by which staff type.

22. The method of claim 13, wherein the target performance goal comprises an interval of time and staffing profiles.

23. The method of claim 22, wherein the interval of time comprises a week.

24. The method of claim 23, wherein the week interval comprises a minimum and a maximum capture rate profile by contact type to staff type.

25. The method of claim 24, wherein the capture rate is a percentage range from 0 to 100.

26. A method for configuring a telecommunication network comprising a network configuration optimization system and an automatic communication distributor operatively coupled to a plurality of agent telecommunication stations for in a multi-skilled contact center operation environment including a plurality of staff comprising a plurality of staff types, the method comprising the steps of:

a. using the network configuration optimization system to build at least one model using predetermined input metrics for one or more respective queues maintained by the automatic communication distributor, wherein each of said models simulates behavior of the one or more respective queues;

b. using the network configuration optimization system to determine a distribution demonstrative of a virtual representation of a historical environment of the contact center operation environment at different time intervals;

c. using the network configuration optimization system to create a table for each of the at least one model by altering a staff count for the contact center, wherein the table represents service performance of the contact center operation environment for the respective staff count as predicted by the respective model;

d. using the network configuration optimization system to build an other model from the at least one model built, wherein said other model simulates how contacts in each of the one or more queues are routed in the telecommunication network and which of the plurality of staff types handles the contacts;

e. using the network configuration optimization system to evaluate the service performance to determine if excess ones of the plurality of staff are available by performing a first linear programming formulation using the created table, wherein if excess ones of the plurality of staff are found to be available, creating an other linear programming formulation to allocate the excess ones of the plurality of staff to a corresponding one of the plurality of staff types according to the ratio of staff types from the first linear programming formulation;

f. configuring the telecommunication network by assigning staff type designations to the plurality of agent telecommunication stations in accordance with the determination of step (e); and g. using the automatic communication distributor to route communications to the plurality of agent telecommunication stations in accordance with the staff type designations assigned to each of the plurality of agent telecommunication stations in step (f).

27. The method of claim 26, wherein the determining of step (b) is performed by one of the following:

a. selecting the distribution from among the existing historical distributions;

b. deriving the distribution from fitting a curve on existing historical data; and c. deriving the distribution from the average value of data in each interval of time profile.

28. The method of claim 27, wherein said contact center operation environment comprises one or more media types.

29. The method of claim 28, wherein said media types comprise one or more of: E-mail, phone, live chat, callbacks, back office work, video conference, SMS, and social media.

30. The method of claim 26, wherein the pre-determined input metrics for one or more queues comprise one or more of the following: volume, average handle time, staff, routing profile, contact priorities, goals, target performance metrics, and target performance goals.

31. The method of claim 26, wherein the at least one model of step (a) are built using closed form simulation.

32. The method of claim 26, wherein the type of staff comprises at least one of: grouping of similar skills, grouping of teams, and grouping of departments.

33. The method of claim 26, wherein said altering of staff count comprises adding an additional staff.

34. The method of claim 26, wherein the one or more queues comprise a contact queue.

35. The method of claim 26, wherein the one or more queues comprise an interaction queue.

* * * * *